US012469399B2

(12) United States Patent
Beran et al.

(10) Patent No.: US 12,469,399 B2
(45) Date of Patent: Nov. 11, 2025

(54) DISTRIBUTED EVENT MANAGEMENT FRAMEWORK FOR AERIAL VEHICLES

(71) Applicant: HONEYWELL INTERNATIONAL INC., Charlotte, NC (US)

(72) Inventors: Jan Beran, Charlotte, NC (US); Pavel Drasil, Slapanice (CZ); Jiri Svoboda, Brno (CZ); Miroslav Matousek, Brno (CZ); Dorin Maxim, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 288 days.

(21) Appl. No.: 18/187,219

(22) Filed: Mar. 21, 2023

(65) Prior Publication Data

US 2024/0321121 A1    Sep. 26, 2024

(51) Int. Cl.
*B62M 6/45* (2010.01)
*B64D 45/00* (2006.01)
(Continued)

(52) U.S. Cl.
CPC .............. *G08G 5/50* (2025.01); *B64D 45/00* (2013.01); *G05D 1/101* (2013.01); *G08G 5/55* (2025.01)

(58) Field of Classification Search
CPC . G08G 5/50; G08G 5/55; B64D 45/00; G05D 1/101
(Continued)

(56) References Cited

U.S. PATENT DOCUMENTS 8,600,587 B1    12/2013    Seah et al.
9,257,048 B1    2/2016    Offer et al.
(Continued)

FOREIGN PATENT DOCUMENTS

CA    3133505 A1    4/2022
EP    3869486 A1    8/2021
EP    3992945 A1    5/2022

OTHER PUBLICATIONS

David Watkins et al., "Pilot Support System: A Machine Learning Approach," 2018 12th IEEE international Conference on Semantic Computing, 325-328, (Jan. 31, 2018).
(Continued)

*Primary Examiner* — Andrew Joseph Rudy
(74) *Attorney, Agent, or Firm* — ALSTON & BIRD LLP

(57) ABSTRACT

Embodiments of the present disclosure are directed to an event management framework configured to mitigate events impacting the operation of a vehicle. Embodiments can receive a set of vehicle operation constraints, receive vehicle sensor data, and receive travel event data associated with the operation of the aerial vehicle. Embodiments include an event management engine configured to determine a set of recommendations related to the events. The event management engine is distributed across multiple operational segments of the event management framework. The event management engine can determine a respective computing device of the multiple operational segments for determining the set of recommendations based at least in part on a respective classification of the one or more events. The event management engine can also cause execution of the respective recommendations, where causing the execution of the respective recommendations causes operation of one or more vehicle systems affecting control of the aerial vehicle.

20 Claims, 7 Drawing Sheets

(51) Int. Cl.
  *G05D 1/00* (2006.01)
  *G08G 5/50* (2025.01)
  *G08G 5/55* (2025.01)

(58) Field of Classification Search
  USPC .......................................................... 701/3
  See application file for complete search history.

(56) References Cited

U.S. PATENT DOCUMENTS

| | | | |
|---|---|---|---|
| 9,633,561 B2 | 4/2017 | Stanek et al. | |
| 9,780,967 B2* | 10/2017 | Sargent | G07C 5/008 |
| 10,202,204 B1* | 2/2019 | Daidzic | G08G 5/22 |
| 10,921,826 B2 | 2/2021 | Groden et al. | |
| 11,150,654 B2 | 10/2021 | Michini et al. | |
| 11,417,109 B1 | 8/2022 | Theimer et al. | |
| 11,440,515 B2* | 9/2022 | Pandey | B60T 13/662 |
| 11,679,874 B2* | 6/2023 | Yuksel | H02P 5/46 |
| | | | 701/3 |
| 12,184,498 B2* | 12/2024 | Mannengal | G06F 21/577 |
| 12,205,422 B2* | 1/2025 | Ramic | G06F 3/165 |
| 12,272,448 B1* | 4/2025 | Forehand | G16H 10/60 |
| 2004/0267413 A1* | 12/2004 | Keber | B64D 45/0031 |
| | | | 701/5 |
| 2007/0010944 A1* | 1/2007 | Ferrebee, Jr. | G08G 1/166 |
| | | | 701/117 |
| 2020/0226940 A1 | 7/2020 | Srinivasan et al. | |
| 2022/0204180 A1 | 6/2022 | Sellmann et al. | |
| 2023/0356860 A1* | 11/2023 | Barber | B64D 45/00 |

OTHER PUBLICATIONS

Extended European Search Report Mailed on Sep. 6, 2024 for EP Application No. 24160045, 9 page(s).

* cited by examiner

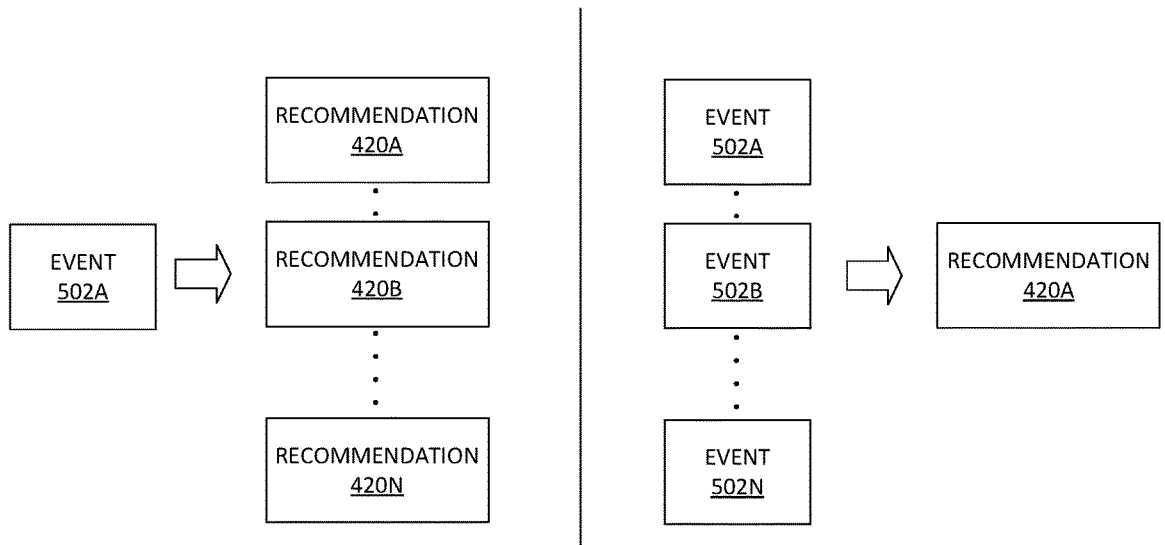
FIG. 5A
FIG. 5B
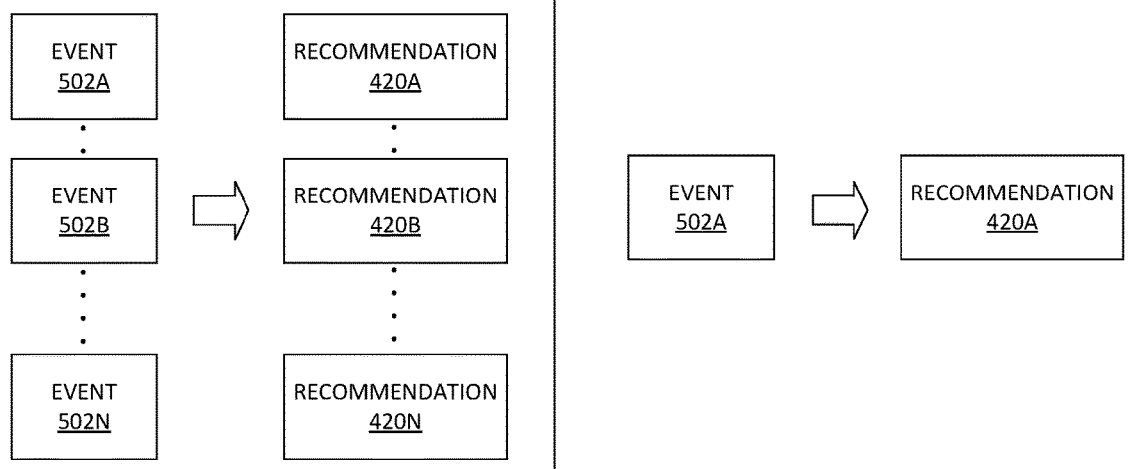
FIG. 5C
FIG. 5D

DISTRIBUTED EVENT MANAGEMENT FRAMEWORK FOR AERIAL VEHICLES

TECHNICAL FIELD

Embodiments of the present disclosure generally relate to managing events associated with the operation of a vehicle, and specifically to a distributed event management framework configured to generate actionable recommendations associated with multiple events impacting the operation of an aerial vehicle.

BACKGROUND

In many circumstances, there are multiple factors that can impact the efficiency, safety, and/or operation of an aerial vehicle. Various sensors, monitors, and systems associated with the aerial vehicle may provide raw data related to particular operational components of the aerial vehicle to provide situational awareness, contextual information, and/or other helpful data to operator(s) of the aerial vehicle. However, as multiple events impacting the operation of the aerial vehicle occur, the operator(s) of the aerial vehicle may have a limited amount of time and/or knowledge with which to evaluate the specific scope and criticality of the events and, as such, may not be able to accurately determine an appropriate mitigative action with which to address the events.

Inventors have discovered problems with current implementations of event management techniques related to aerial vehicles. Through applied effort, ingenuity, and innovation, the inventors have solved many of these problems by developing the solutions embodied in the present disclosure, the details of which are described further herein.

BRIEF SUMMARY

In general, embodiments of the present disclosure herein provide a distributed framework for managing multiple events impacting the operation of an aerial vehicle. Other implementations will be, or will become, apparent to one with skill in the art upon examination of the following figures and detailed description. It is intended that all such additional implementations be included within this description be within the scope of the disclosure and be protected within the scope of the following claims.

In accordance with a first aspect of the present disclosure, a computer-implemented method for managing one or more events impacting the operation of a vehicle (e.g., an aerial vehicle) is provided. The computer-implemented method is performable by one or more specially configured computing device(s) embodied in hardware, software, firmware, and/or any combination thereof, for example as described herein. In one example embodiment, the example computer-implemented method includes receiving vehicle sensor data from one or more sensors associated with the operation of the aerial vehicle. The example computer-implemented method further includes receiving travel event data. The example computer-implemented method further includes determining, utilizing an event management engine, one or more events impacting operation of the aerial vehicle. In the example computer-implemented method, the one or more events are determined based at least in part on the travel event data and the vehicle sensor data.

The example computer-implemented method further includes determining, by the event management engine, a set of recommendations related to the one or more events. In the example computer-implemented method, the set of recommendations is determined based at least in part on the first set of vehicle operation constraints. Further in the example computer-implemented method, the event management engine is distributed across at least a first operational segment associated with an event management framework and a second operational segment associated with the event management framework. Further in the example computer-implemented method, the first operational segment comprises at least one offboard segment computing device, and wherein the second operational segment comprises at least one onboard computing device that is onboard the aerial vehicle. Further in the example computer-implemented method, the event management engine determines a respective computing device of the first operational segment or the second operational segment to employ for determining one or more recommendations of the set of recommendations based at least in part on a respective classification of the one or more events. The example computer-implemented method further includes causing execution of the one or more respective recommendations. In the example computer-implemented method, causing the execution of the one or more respective recommendations causes operation of one or more vehicle systems affecting control of the aerial vehicle based at least in part on the one or more respective recommendations.

Additionally or alternatively, in some embodiments of the example computer-implemented method, the computer-implemented method further includes causing rendering of the set of recommendations via the at least one offboard segment computing device or the at least one onboard computing device. The example computer-implemented method further includes receiving, from the at least one offboard segment computing device or the at least one onboard computing device, a confirmation signal. Further in the example computer-implemented method, the confirmation signal comprises data indicative of an acceptance or a rejection of one or more respective recommendations of the set of recommendations. The example computer-implemented method further includes, in response to receiving the confirmation signal, determining a second set of aerial vehicle operation constraints related to the operation of the aerial vehicle. In the example computer-implemented method, determining the second set of aerial vehicle operation constraints comprises updating one or more respective vehicle operation constraints of the first set of vehicle operation constraints. The example computer-implemented method further includes causing rendering of the second set of aerial vehicle operation constraints via the at least one offboard segment computing device or the at least one onboard computing device.

Additionally or alternatively, in some embodiments of the example computer-implemented method, the travel event data comprise at least one of data indicative of a nominal scenario, an emergency scenario, data indicative of a hazard scenario, data indicative of a logistical scenario that alters a voyage of the aerial vehicle, or data indicative of a change in the operation of the one or more vehicle systems affecting control of the aerial vehicle. In the example computer-implemented method, at least a portion of travel event data is based on the vehicle sensor data.

Additionally or alternatively, in some embodiments of the example computer-implemented method, the event management engine is configured as a machine learning model. Further in the example computer-implemented method, the event management engine comprises at least one of a binary rule set, a predetermined rule set, a look-up table, or a specially trained neural network that determines the set of recommendations based on the one or more events and the first set of vehicle operation constraints.

Additionally or alternatively, in some embodiments of the example computer-implemented method, the event management engine can rank the one or more recommendations based on a respective predicted result associated with each of the one or more recommendations. Further in the example computer-implemented method, the event management engine can determine which of the one or more recommendations to render via the at least one offboard segment computing device or the at least one onboard computing device based in part on the respective ranks of the one or more recommendations.

Additionally or alternatively, in some embodiments of the example computer-implemented method, the respective classification of the one or more events determined by the event management engine is based in part on a respective event severity level associated with each of the one or more events.

Additionally or alternatively, in some embodiments of the example computer-implemented method, the one or more events comprise at least one of an emergency event impacting the operation of the aerial vehicle, an optimization event impacting the operation of the aerial vehicle, a hazard event impacting the operation of the aerial vehicle, a logistical event impacting the operation of the aerial vehicle, an environmental event impacting the operation of the aerial vehicle, or a personnel health event impacting the operation of the aerial vehicle.

Additionally or alternatively, in some embodiments of the example computer-implemented method, the computer-implemented method further includes determining the respective computing device of the at least one offboard segment computing device or the at least one onboard computing device to employ for determining the one or more recommendations is based in part on one or more respective computational capabilities associated with the at least one offboard segment computing device and the at least one onboard computing device.

Additionally or alternatively, in some embodiments of the example computer-implemented method, the computer-implemented method further includes determining, by the event management engine, an overall event criticality level associated with two or more distinct events impacting the operation of the aerial vehicle. The example computer-implemented method further includes generating, by the event management engine, one or more recommendations based on the overall event criticality level associated with the two or more distinct events.

In accordance with a second aspect of the disclosure, an apparatus for managing one or more events impacting the operation of a vehicle (e.g., an aerial vehicle) is provided. In one example embodiment, the apparatus includes at least one processor and at least one memory having computer-coded instructions stored thereon, where the computer-coded instructions in execution with the at least one processor causes the apparatus to perform any one of the example computer-implemented methods described herein. In a second example embodiment apparatus, the apparatus includes means for performing each step of any one of the example computer-implemented methods described herein.

In accordance with a third aspect of the disclosure, a computer program product for managing one or more events impacting the operation of a vehicle (e.g., an aerial vehicle) is provided. In one example embodiment computer program product, the computer program product includes at least one non-transitory computer-readable storage medium having computer program code stored thereon that, in execution with at least one processor, configures the computer program product for performing any one of the example computer-implemented methods described herein.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 5A-5D illustrate the one-to-one, one-to-many, many-to-one, and many-to-many relationships between events impacting the operation of a vehicle and recommendations generated in response to the events respectively, in accordance with at least some example embodiments of the present disclosure.

DETAILED DESCRIPTION

Figure 1:
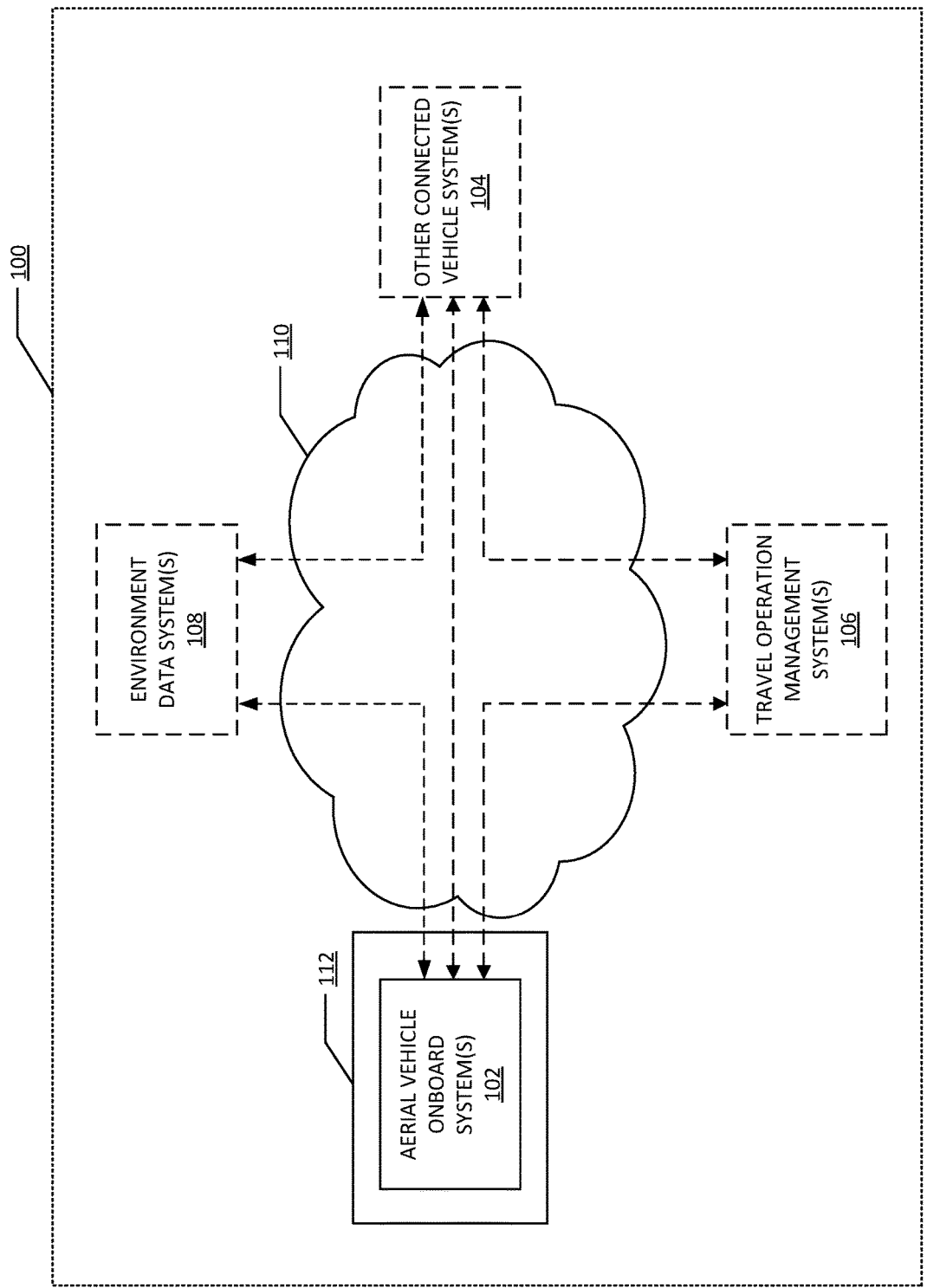
FIG. 1 illustrates an example system that enables event management for one or more events impacting the operation of a vehicle in accordance with at least some example embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

While controlling an aerial vehicle, users operating the vehicle (e.g., pilots, operators, and/or flight crew) must stay aware of all current scenarios impacting the operation of the aerial vehicle. In various contexts, user interfaces may be generated and output, or otherwise rendered, via one or more electronic displays of the aerial vehicle to provide useful contextual information pertinent to the operator of the vehicle. Various contextual information can pertain to data gathered by one or more sensors associated with the vehicle, data received via a communications network, and/or data provided by an operator and/or flight crew member. Frequently, distinct portions of data related to various aspects of the operation of the aerial vehicle are being simultaneously generated and/or received throughout the duration of a flight, requiring the operator to be constantly analyzing the incoming data.

In some circumstances, as various events occur that can impact the operation of the aerial vehicle, the operator may only have a limited amount time to analyze vehicle sensor data and/or any other incoming data pertinent to the operation of the aerial vehicle. For example, depending on the severity of the events, the operator may not have the time and/or skill to analyze the potential outcomes of any actions taken to mitigate the events impacting the operation of the vehicle. In these types of potentially stressful circumstances, the operator must make a decision based at least in part on any insights that may be quickly garnered from the available data and readily conveyed to the operator (e.g., to alter the operation of the vehicle, avoid collision, execute an emergency landing, etc.), such that conveying particular data in particular configurations enabling the operator to make an informed decision as quickly as possible is desired.

Operation of aerial vehicles is an endeavor where efficient decision making is especially desirable. At any given time, an operator of an aerial vehicle (e.g., a pilot) may be presented various data corresponding to operational aspects of a current flight via a respective electronic interface of one or more computing devices associated with the aerial vehicle. Furthermore, each respective electronic interface may be depicting disparate data related to various aspects of the current flight, including but without limitation the current health of the aerial vehicle, environmental factors, and/or the like. The operator must continuously monitor these electronic interface(s) as the operator controls the aerial vehicle to garner an ongoing situational awareness of the vehicle's operation. In this regard, the pilot may analyze the disparate data rendered on such electronic interface(s) to attempt to make an informed decision regarding what maneuvers are appropriate to control the aerial vehicle safely, in a desired direction, to perform a desired movement, and/or the like, at any given time. Such electronic interface(s) often include multiple individual elements, each associated with different data and/or meant to convey different information to the pilot. As such, the operator must process and analyze significant amounts of disparate data to understand the overall situation associated with the flight of the aerial vehicle. It is therefore desirable to have a decision-making system in place that can assist the operator in taking the correct actions in response to one or more events impacting the operation of the aerial vehicle.

As the aerospace industry moves ever towards semi-autonomously and autonomously controlled aerial vehicles, upcoming operators, pilots, and/or flight crew in the field may have further limited knowledge and/or limited experience with which to make crucial decisions regarding one or more events impacting the operation of the aerial vehicle. In this regard, the cognitive workload for the operator to gain a complete situational awareness based at least in part on disparate data coming from a multitude of sources remains high or even may increase, and, in some circumstances, it is difficult or impossible for an operator to make an accurate decision and perform a corresponding action based at least in part on the many nuances of a given, often time-sensitive, situation.

Embodiments of the present disclosure provide for generating, outputting, and executing one or more recommendations for managing one or more events impacting the operation of an aerial vehicle. For instance, embodiments provide a distributed event management framework (EMF) for managing the safe operation of one or more aerial vehicles in a multitude of environments. The EMF is composed of various segments (e.g., an EMF offboard segment and an EMF vehicle segment) comprising various computing devices configured to integrate various offboard control systems, onboard aerial vehicle systems, and/or communications systems. The various segments of the EMF are configured to analyze one or more events impacting the operation of the vehicle and to generate one or more actionable recommendations with which to mitigate the one or more events.

In various embodiments, the EMF features an event management engine configured as a machine learning model deployed to continually receive one or more portions of travel event data, vehicle sensor data, vehicle system data, air traffic data, environmental data, logistical data, personnel data, and/or any other relevant data related to a particular vehicle, such as an aerial vehicle. Such data can be generated, measured, calculated, and/or otherwise obtained from the one or more computing devices comprised in both the EMF offboard segment and/or the EMF vehicle segment and configured as model input for the event management engine. The event management engine can determine based at least in part on the model input that one or more events are occurring that may impact the operation of the vehicle. Additionally, the event management engine can classify an event severity level associated with the one or more events and generate one or more event-specific recommendations for mitigating the one or more events.

The event management engine can be distributed across the EMF. For example, the event management engine can be distributed between the EMF vehicle segment and the EMF offboard segment and, as such, can receive model input from the EMF vehicle segment and/or the EMF offboard segment. Distributing the event management engine across the EMF provides the benefit of distributing the computational load and processing power required to generate recommendations and/or to act upon the generated recommendations. Distributing the event management engine across the EMF provides the benefit of allowing an aerial vehicle associated with the EMF vehicle segment to mitigate time-sensitive emergency scenarios without having to first communicate with and/or rely upon offboard control systems (e.g., offboard control systems associated with the EMF offboard segment).

Furthermore, based at least in part on the criticality of one or more events impacting the operation of an aerial vehicle, the event management engine can determine whether the one or more events should be managed by the EMF vehicle segment or the EMF offboard segment. Determining whether the EMF vehicle segment should manage the event can be based at least in part on various factors including, but not limited to, an event severity level associated with the one or more events, an event type associated with the one or more events, the computational processing capabilities of one or more aerial vehicle onboard system(s) associated with the aerial vehicle, the computational processing capabilities of an EMF vehicle apparatus, and/or the computational processing capabilities of an EMF offboard apparatus. In this way, the event management engine can determine which respective computing devices associated with the EMF vehicle segment and/or the EMF offboard segment are best qualified to make decisions, generate recommendations, and/or assume control of the one or more vehicle systems (e.g., aerial vehicle onboard system(s)) of the aerial vehicle).

In various circumstances, there can exist a one-to-one, one-to-many, many-to-one, or many-to-many relationship between events impacting the operation of a vehicle and recommendations generated in response to the events. For example, in one particular circumstance, the event management engine may determine that a single event is impacting the operation of an aerial vehicle and, as such, can generate a plurality of recommendations with which to mitigate the single event. Alternatively, in another particular circumstance, the event management engine may determine that multiple distinct events are impacting the operation of the aerial vehicle and the event management engine may determine that only one recommendation would be applicable for mitigating the multiple events. Alternatively, in yet another particular circumstance, the event management engine can determine that multiple events are impacting the operation of the aerial vehicle and, as such, the event management engine can generate a plurality of recommendations with which to mitigate the multiple events.

Additionally, the event management engine can determine which recommendations of the plurality of recommendation will have the greatest positive effect on the current situation associated with a vehicle being impacted by one or more events. For example, in some embodiments, the event management engine can rank one or more recommendations of the set of recommendations based at least in part on a predicted result associated with the execution of the one or more recommendations. For instance, a first recommendation can be ranked higher relative to a second recommendation based at least in part on a predicted result associated with the first recommendation.

One or more recommendations generated by the event management engine can be rendered via a respective electronic interface associated with one or more computing devices related to the EMF in a human-readable format such that an operator, pilot, ground crew member, flight crew member, and/or passenger can interpret and/or select the one or more recommendations via the electronic interface. In various embodiments, the one or more recommendation can be rendered via the respective electronic interfaces based on the determined rank associated with the one or more respective recommendations. Selecting the one or more recommendations via a respective electronic interface can initiate the execution of one or more actions and/or reconfigurations related to the one or more onboard aerial vehicle systems of the aerial vehicle such that the aerial vehicle can be safely controlled in response to the one or more events.

In this regard, embodiments of the present disclosure enable an operator of the aerial vehicle to reduce the time required to accurately perform an analysis of the current situation associated with the aerial vehicle, generate potential solutions based at least in part on the analysis, and ultimately decide upon an optimal solution. By enabling quicker action, such embodiments thus reduce the likelihood of errors, unsafe scenarios, and/or other disastrous circumstances arising from incorrect decisions made by an operator and/or delayed decision-making by the operator due to circumstances associated with the one or more events impacting the operation of the vehicle. Furthermore, the EMF can support one or more operators that may lack the knowledge and/or experience with which to timely mitigate the one or more events in order to ensure the safety, efficiency, and optimal operation of the aerial vehicle, the flight crew, and/or the passengers of the aerial vehicle.

It will be appreciated that embodiments of the present disclosure may be advantageous for a myriad of vehicle types. In this regard, aerial vehicles are utilized as an exemplary type of vehicle for purposes of simplifying the disclosure. The description specific to aerial vehicles should not limit the scope and spirit of the disclosure unless otherwise explicitly stated. For example, the methods described herein may be applicable to the fields of autonomous automobile operation, autonomous watercraft operation, and/or the like.

Definitions

"Aerial vehicle" refers to any manned or unmanned vehicle capable of air travel. Non-limiting examples of an aerial vehicle include a passenger airplane, a helicopter, an unmanned aerial vehicle, an electronic vertical takeoff or landing (eVTOL) aircraft, a jet, a drone, or a quadcopter. At least some aerial vehicles are controllable by system(s) onboard the aerial vehicle. At least some aerial vehicles are controllable by system(s) external from the aerial vehicle including, and without limitation, remote control system(s), ground system(s), and centralized control system(s).

"Event management framework (EMF)" refers to a distributed event mitigation platform configured to monitor the operation of one or more aerial vehicles to determine one or more events that can impact the operation of the one or more aerial vehicles. An EMF can be associated with one or more enterprises such as, for example, a commercial airline, an aerial delivery enterprise, a logistics enterprise, an urban air mobility (UAM) enterprise, an advanced air mobility (AAM) enterprise, a military enterprise, and/or the like. The EMF can comprise an event management engine configured as a machine learning model to detect and mitigate one or more events impacting the operation of the one or more aerial vehicles. An EMF can be distributed over one or more operational segments (e.g., an EMF offboard segment and/or an EMF vehicle segment) such that the one or more operations associated with the one or more recommendations generated by the event management engine can be delegated to one or more respective computing devices associated with the one or more operational segments.

"Operational segment" refers to a distinct operational subsystem of the EMF. Generally, an operational segment can be a compartmentalization of one or more system(s), computing device(s), service(s), and/or data store(s) associated with a particular function of the EMF. For example, in various embodiments, the EMF is split between at least two operational segments, the EMF vehicle segment and the EMF offboard segment. The EMF offboard segment can be understood as a subsystem of the EMF that is generally configured to support the one or more vehicles in a vehicle fleet associated with the EMF. In the context of the aerospace industry, the EMF offboard segment can be likened to one or more ground control stations. The EMF offboard segment generally has higher computational capacities than the EMF vehicle segment and can interface with many external systems from which the EMF offboard segment can obtain various data relevant to the operation of the one or more vehicles. For example, the EMF offboard segment can interface with one or more travel operation management system(s), environment data system(s), air traffic control system(s), urban air mobility (UAM) systems, and/or the like. The EMF vehicle segment can be understood as a subsystem of the EMF that is generally made up of one or more vehicles associated with the EMF as well as the one or more vehicle systems associated with the one or more vehicles. The EMF vehicle segment and the EMF offboard segment remain in constant contact and are configured to transmit and/or receive data related to the EMF and/or the operation of the vehicle via a communications network.

"Event" refers to a situation and/or circumstance that has the potential to impact the operation of an aerial vehicle. For instance, an event can be an emergency situation impacting the operation of the aerial vehicle and/or one or more persons associated with the aerial vehicle. An event can also be a circumstance affecting the optimization of one or more vehicle systems associated with the aerial vehicle. A few non-limiting examples of event types that can be associated with a respective event include, an emergency event type, a hazard event type, a mechanical failure event type, a logistical event type, an environmental event type, an optimization event type, a personnel health event type, and/or the like. Determination of an event can be based in part on one or more portions of travel event data and/or one or more portions of vehicle sensor data.

"Travel event data" refers to data comprising at least one of data indicative of a nominal scenario, an emergency scenario, data indicative of a hazard scenario, data indicative of a logistical scenario that alters the voyage of the aerial vehicle, and/or data indicative of a change in the operation of a system affecting control of the aerial vehicle. In various embodiments, at least a portion of the travel event data is based at least in part on vehicle sensor data collected, measured, calculated, and/or otherwise generated by one or more sensors associated with the aerial vehicle.

"Event management engine" refers to a machine learning model associated with the EMF that can continually receive model input comprising one or more events, one or more portions of travel event data, one or more portions of environmental data, one or more portions of vehicle sensor data, one or more operator inputs, one or more flight plans, and/or one or more portions of data generated by one or more systems associated with the EMF. In various embodiments, the event management engine can receive the model input via a communications network associated with the EMF. Based at least in part on the received model input, the event management engine can generate one or more portions of model output configured as recommendations to be rendered via one or more computing device(s) associated with the various operational segments of the EMF.

"Recommendation" refers to model output generated by the event management engine representing one or more suggested actionable measures that can be taken to address one or more events impacting the operation of an aerial vehicle depending on a respective criticality of the one or more events. Recommendations can be configured to be human-readable and can be rendered via a respective electronic interface associated with one or more computing devices such as, for example an EMF vehicle apparatus associated with the aerial vehicle and/or an EMF offboard apparatus associated with the EMF offboard segment. Recommendations can be confirmed by an operator of the aerial vehicle, where confirmation can be a selection indication associated with the recommendation generated via one or more computing devices and where the confirmation causes execution of the recommendation. Executing a recommendation comprises operating one or more systems associated with the aerial vehicle (e.g., one or more aerial vehicle onboard systems) to control the operation of the aerial vehicle. In some embodiments, a recommendation must be confirmed by a human operator or pilot responsible for operating the aerial vehicle. In various other embodiments, recommendations can be automatically executed depending on the criticality of the corresponding event impacting the operation of the aerial vehicle.

"Vehicle sensor data" refers to electronically managed data utilized by a vehicle for operation. Vehicle sensor data can be any data collected, measured, calculated, and/or otherwise generated by one or more sensors associated with the vehicle.

"Operational mode" refers to a current state of operation for an aerial vehicle and characterizes a way in which the aerial vehicle is currently operating at a given time. For example, an aerial vehicle may be operating in an operational mode such as an economy mode in which one or more systems associated with the aerial vehicle are configured to conserve energy, fuel, and/or otherwise reduce power consumption while traveling.

Example Systems, Apparatuses, and Dataflows of the Disclosure

FIG. 1 illustrates an example system that enables event management for one or more events impacting the operation of an aerial vehicle in accordance with at least some example embodiments of the present disclosure. Specifically, FIG. 1 depicts an example system 100 within which embodiments of the present disclosure may operate to mitigate one or more events impacting the operation of an aerial vehicle 112. As depicted, the system 100 includes an aerial vehicle onboard system(s) 102 associated with the aerial vehicle 112. Additionally or alternatively, in some embodiments, the aerial vehicle 112 is communicable (e.g., via the aerial vehicle onboard system(s) 102) with one or more external computing device(s) and/or system(s). For example, in some embodiments, the aerial vehicle onboard system(s) 102 is optionally communicable with some or all of the other connected vehicle system(s) 104, travel operation management system(s) 106, and/or environment data system(s) 108. In some such embodiments, the aerial vehicle onboard system(s) 102 communicates with the other connected vehicle system(s) 104, travel operation management system(s) 106, and/or environment data system(s) 108 via one or more specially configured communications network(s), for example the communications network 110.

In some embodiments, the aerial vehicle onboard system(s) 102 includes any number of computing device(s) and/or system(s) embodied in hardware, software, firmware, and/or a combination thereof, that control, operate, and/or otherwise function onboard an aerial vehicle 112. For example, in some embodiments, the aerial vehicle onboard system(s) 102 includes one or more physical component(s) of the aerial vehicle 112, including and without limitation one or more display(s), flight management system(s), travel operation management system(s), engine(s), wing(s), prop(s), motor(s), antenna(s), landing gear(s), and/or the like. In some embodiments, the aerial vehicle onboard system(s) 102 includes one or more sensor(s) that gather, collect, and/or otherwise aggregates sensor data relevant to operation of the aerial vehicle 112, associated with the aerial vehicle 112, and/or otherwise associated with an environment of the aerial vehicle 112.

Additionally or alternatively, in some embodiments, the aerial vehicle onboard system(s) 102 includes one or more computing device(s) and/or system(s) embodied in hardware, software, firmware, and/or a combination thereof, that control(s) operation of one or more physical components of the aerial vehicle 112. For example and without limitation, in some embodiments the aerial vehicle onboard system(s) 102 includes computing device(s) and/or system(s) that control one or more display(s), flight management system (s), travel operation management system(s), engine(s), wing(s), prop(s), motor(s), antenna(s), landing gear(s), sensor(s), and/or the like.

Additionally or alternatively, in some embodiments, the aerial vehicle onboard system(s) 102 includes one or more computing device(s) and/or system(s) embodied in hardware, software, firmware, and/or a combination thereof, that generates and/or otherwise causes rendering of one or more user interface(s) renderable to one or more display(s) onboard and/or otherwise associated with the aerial vehicle 112. In some embodiments such computing device(s) and/or system(s) specially configure some or all element(s) of user interface(s) to be rendered based at least in part on received data. It should be appreciated that the aerial vehicle onboard system(s) 102 in some embodiments includes any of a myriad of specially configured computing device(s) and/or system(s) that enable the aerial vehicle 112 to operate in a particular manner of airborne travel.

In some embodiments, the aerial vehicle onboard system(s) 102 includes one or more personal computer(s), end-user terminal(s), monitor(s) or other display(s), and/or the like. Additionally or alternatively, in some embodiments, the aerial vehicle onboard system(s) 102 includes one or more data repository/data repositories embodied in hardware, software, firmware, and/or any combination thereof, to support functionality provided by the aerial vehicle onboard system(s) 102. For example, in some embodiments, such data repositories provide data storage functionality on the same computing device(s) and/or other dedicated computing device(s) of the aerial vehicle onboard system(s) 102. Additionally or alternatively still, in some embodiments, the aerial vehicle onboard system(s) 102 includes one or more specially configured integrated system(s), circuit(s), and/or the like that process data received by and/or control one or more other computing device(s) and/or system(s), or physical component(s), associated with the aerial vehicle 112.

The aerial vehicle 112 may embody any of a myriad of aerial vehicle types. The aerial vehicle 112 includes any number of physical component(s) that enable air travel, including and without limitation prop(s), rotor(s), engine(s), wing(s), and/or the like. Additionally or alternatively, the aerial vehicle 112 includes any number of a myriad of controls for operating the physical components of the aerial vehicle 112 to achieve such airborne travel. For example, in some embodiments, the aerial vehicle 112 includes a forward-flying aerial vehicle. In some embodiments, the aerial vehicle 112 includes a vertical takeoff and landing aerial vehicle. It will be appreciated that the aerial vehicle 112 may be entirely manually controlled, semi-autonomous, fully autonomous for one or more operations, or any combination thereof. Non-limiting examples of an aerial vehicle 112 include a plane generally, a helicopter, a drone, an electric vertical takeoff and landing aircraft (eVTOL), a prop-based aircraft, a jet, and/or the like. Any particular vehicle type utilized in this disclosure is purely illustrative, and not to limit the scope and/or spirit of this disclosure or the appended claims presented herewith.

The other connected vehicle system(s) 104 includes computing device(s), system(s), and/or onboard system(s) of other vehicle(s) communicatively coupled with the aerial vehicle 112 associated with aerial vehicle onboard system(s) 102. It will be appreciated that the other connected vehicle system(s) 104 in some embodiments includes computing device(s) and/or system(s) of one or more other aerial vehicle(s) of the same-type operating within the same environment as the aerial vehicle associated with aerial vehicle onboard system(s) 102. For example, in some embodiments some of the other connected vehicle system(s) 104 include computing device(s) and/or system(s) of other aerial vehicle(s) in a fleet of a particular type of aerial vehicle. In some such embodiments, sensor data (for example) captured via such other connected vehicle system(s) 104 similarly may be applicable to the aerial vehicle 112 as well. Additionally or alternatively, in some embodiments, the other connected vehicle system(s) 104 includes computing device(s) and/or system(s) of ground vehicle(s), other types of aerial vehicle(s), and/or the like, or any combination thereof.

In some embodiments, the aerial vehicle onboard system(s) 102 receives data from one or more of the other connected vehicle system(s) 104 that provides additional context with respect to the environment in which the aerial vehicle 112 associated with aerial vehicle onboard system(s) 102 is operating. Such data may include sensor data that the aerial vehicle onboard system(s) 102 is able to capture, or in some embodiments includes sensor data not capturable by the aerial vehicle onboard system(s) 102. For example, in some embodiments, the aerial vehicle onboard system(s) 102 communicates with the other connected vehicle system(s) 104 to determine a position of other aerial vehicle(s), object(s), environmental feature(s) (e.g., buildings, terrain, and/or the like) within the environment of the aerial vehicle associated with aerial vehicle onboard system(s) 102, and/or the like. Additionally or alternatively, in some embodiments, the aerial vehicle onboard system(s) 102 communicate with one or more of the other connected vehicle system(s) 104 to receive sensor data of a particular data type that is not capturable directly by the aerial vehicle onboard system(s) 102. For example, in some embodiments, the aerial vehicle associated with the aerial vehicle onboard system(s) 102 does not include a particular sensor for capturing a particular type of sensor data, and instead receives such data of the particular data type from the other connected vehicle system(s) 104.

In some embodiments, the travel operation management system(s) 106 includes one or more computing device(s) embodied in hardware, software, firmware, and/or the like that generate, assign, and/or maintain vehicle operation constraints (e.g., flight plan information, mission goals, etc.) for one or more aerial vehicle(s). For example, in some embodiments, the travel operation management system(s) 106 include computing device(s) and/or system(s) of an air traffic control system and/or other authoritative entity that assigns flight plan information to one or more aerial vehicle(s). Such information may include, without limitation, flight plan information embodying a visual sight rules (VFR) flight plan, an instrument flight rules (IFR) flight plan, a composite flight plan, and/or the like defining conditions for operating an aerial vehicle 112 within a particular environment. In some embodiments, the travel operation management system(s) 106 captures and/or otherwise obtains particular data for relaying to the aerial vehicle 112.

In some embodiments, the travel operation management system(s) 106 includes one or more application server(s), end user terminal(s), personal computer(s), mobile device(s), user device(s), and/or the like that generate, assign, and/or transmit flight plan information to aerial vehicle(s). Additionally or alternatively, in some embodiments, the travel operation management system(s) 106 includes one or more data repository/repositories embodied in hardware, software, firmware, and/or a combination thereof, that stores flight plan information, links between flight plan information and particular aerial vehicle(s), and/or the like. In some such embodiments, the flight plan information includes navigational data, environmental data, weather data, and/or obstacle data for one or more environment(s) within which an aerial vehicle is or will be operating. Additionally or alternatively, in some embodiments, the travel operation management system(s) 106 includes one or more computing device(s) and/or system(s) that detect and/or monitor operation of one or more aerial vehicle(s) within an environment. For example, in some embodiments, the travel operation management system (s) 106 includes one or more radar system(s) that monitor one or more environment(s).

The environment data system(s) 108 includes one or more computing device(s) and/or system(s) that monitor, capture, and/or otherwise store data representing one or more aspect(s) of a real-world environment, object(s) therein, and/or aerial vehicle(s) therein. In some embodiments, the environment data system(s) 108 includes one or more data repository/repositories that store weather and/or obstacle data for one or more environment(s). Additionally or alternatively, in some embodiments, the environment data system(s) 108 includes one or more data repository/repositories that store data embodying other environmental aspect(s) that interact with or otherwise affect operation of aerial vehicle(s) in an environment, for example the aerial vehicle 112. In some embodiments, the environment data system(s) 108 includes a satellite system that monitors one or more aspect(s) of an environment, for example a satellite weather provider and/or satellite radio provider to the aerial vehicle 112. Alternatively or additionally still, in some embodiments, the environment data system(s) 108 embody or include a flight services data provider system (e.g., a Honeywell flight services system). In some embodiments, the environment data system(s) 108 embodies a subsystem of the travel operation management system(s) 106 and/or other connected vehicle system(s) 104.

In some embodiments, the environment data system(s) 108 includes one or more application server(s), end user terminal(s), personal computer(s), mobile device(s), user device(s), and/or the like. Additionally or alternatively, in some embodiments, the environment data system(s) 108 includes one or more database server(s) specially configured to store data pushed from one or more other computing device(s) and/or system(s). In some embodiments, the environment data system(s) 108 includes one or more remote and/or cloud computing device(s) accessible to the aerial vehicle onboard system(s) 102, other connected vehicle system(s) 104, and/or travel operation management system(s) 106 over a communications network, such as the communications network 110.

In some embodiments the communications network 110 enables communication between various computing device(s) and/or system(s) utilizing one or more combination(s) of wireless and/or wired data transmission protocol(s). In this regard, the communications network 110 may embody any of a myriad of network configurations. In some embodiments, the communications network 110 embodies a public network (e.g., the Internet) in whole or in part. In some embodiments, the communications network 110 embodies a private network (e.g., an internal network between particular computing devices) in whole or in part. Alternatively or additionally, in some embodiments the communications network 110 embodies a direct or private connection facilitated over satellite or radio system(s) that enables long-range communication between aerial vehicle(s) and corresponding grounded system(s). In some other embodiments, the communications network 110 embodies a hybrid network (e.g., a network enabling internal communications between particular connected computing devices and external communications with other computing devices). The communications network 110 may include one or more base station(s), relay(s), router(s), switch(es), cell tower(s), communications cable(s), satellite(s), radio antenna(s) and/or related control system(s), and/or associated routing station(s), and/or the like. In some embodiments, the communications network 110 includes one or more user entity-controlled computing device(s) and/or other enterprise device(s) (e.g., an end-user's or enterprise router, modem, switch, and/or other network access point) and/or one or more external utility devices (e.g., Internet service provider communication tower(s), cell tower(s), and/or other device(s)). In some embodiments, the aerial vehicle onboard system(s) 102 communicates with one or more of the other connected vehicle system(s) 104, travel operation management system(s) 106, environment data system(s) 108 over the communications network 110 to receive and/or transmit the data described herein for generating the user interface(s) for providing to one or more display(s) of an aerial vehicle. In some embodiments, the communications network 110 embodies a Data-link uplink to the aerial vehicle 112 (e.g., via the aerial vehicle onboard system(s) 102) that communicatively couple the airborne system(s) to the ground system(s).

Figure 2:
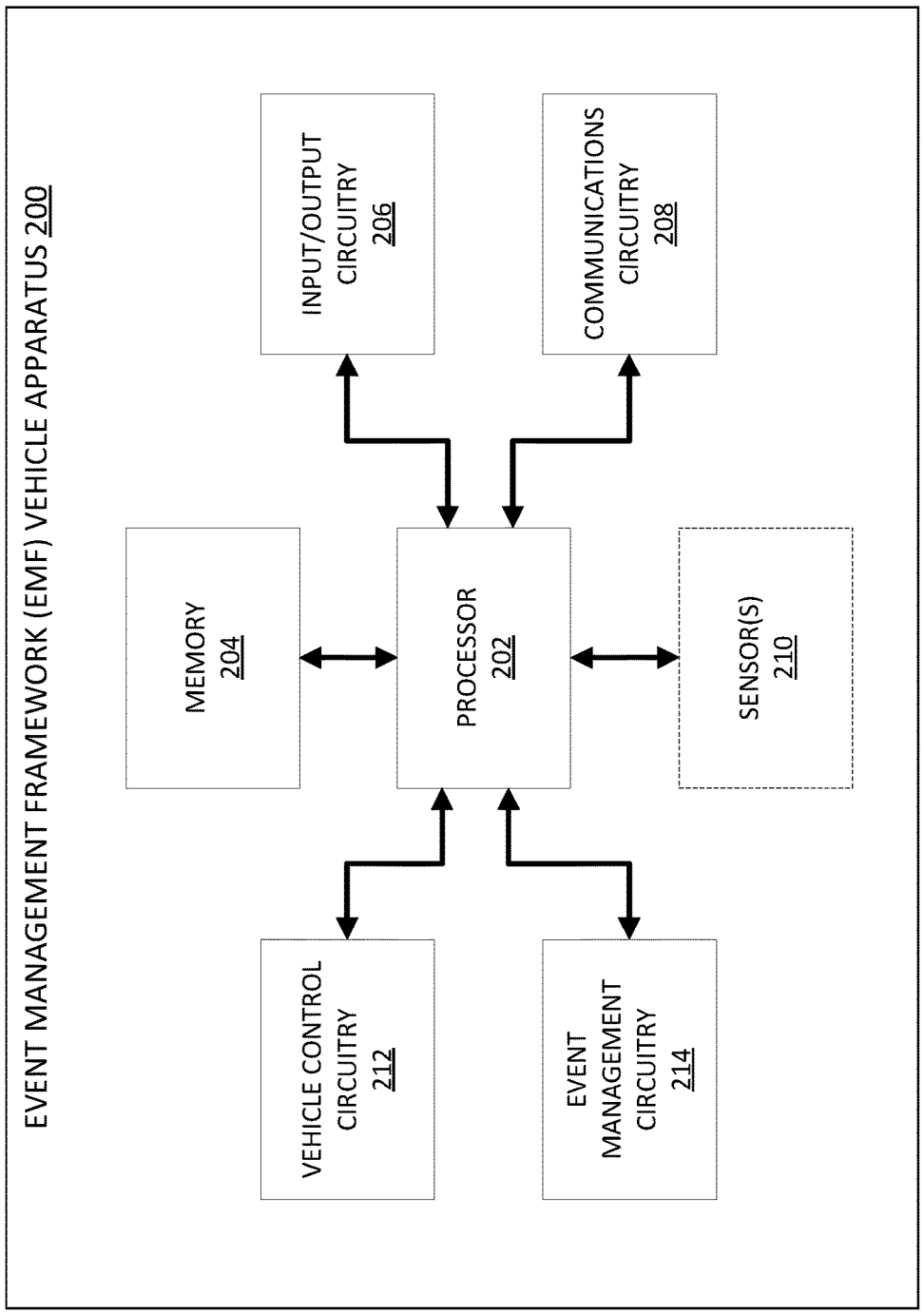
FIG. 2 illustrates an example event management framework (EMF) vehicle apparatus in accordance with at least some example embodiments of the present disclosure.

FIG. 2 illustrates an example event management framework (EMF) vehicle apparatus in accordance with at least some example embodiments of the present disclosure. Specifically, FIG. 2 depicts an EMF vehicle apparatus 200. In some embodiments, one or more computing device(s) and/or system(s) of an aerial vehicle, for example included in or embodied by the aerial vehicle onboard system(s) 102 onboard an aerial vehicle 112, is embodied by one or more computing devices such as the EMF vehicle apparatus 200 as depicted and described in FIG. 2. As depicted, the EMF vehicle apparatus 200 includes a processor 202, memory 204, input/output circuitry 206, communications circuitry 208, sensor(s) 210, vehicle control circuitry 212, and/or event management circuitry 214. In some embodiments, the EMF vehicle apparatus 200 is configured, using one or more of the sets of circuitry embodying processor 202, memory 204, input/output circuitry 206, communications circuitry 208, sensor(s) 210, vehicle control circuitry 212, and/or event management circuitry 214, to execute one or more operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the EMF vehicle apparatus 200 provide or supplement the functionality of another particular set of circuitry. For example, the processor 202 in some embodiments provides processing functionality to any of the other sets of circuitry, the memory 204 provides storage functionality to any of other the sets of circuitry, the communications circuitry 208 provides network interface functionality to any of the other sets of circuitry, and/or the like.

In some embodiments, the processor 202 (and/or co-processor or any other processing circuitry assisting or otherwise associated with the processor) is/are in communication with the memory 204 via a bus for passing information among components of the EMF vehicle apparatus 200. In some embodiments, for example, the memory 204 is non-transitory and includes for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the EMF vehicle apparatus 200 to carry out various functions in accordance with example embodiments of the present disclosure.

In various embodiments, the processor 202 is embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the EMF vehicle apparatus 200, and/or one or more remote or "cloud" processor(s) external to the EMF vehicle apparatus 200.

In an example embodiment, the processor 202 is configured to execute instructions stored in the memory 204 or otherwise accessible to the processor 202. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with executing one or more recommendations generated by the event management engine associated with the EMF, for example as described with respect to operating and/or reconfiguring the aerial vehicle onboard system(s) 102 in FIG. 1 and/or as described further herein. In some embodiments, the processor 202 includes hardware, software, firmware, and/or a combination thereof, that receives data including one or more portions of travel event data, vehicle sensor data, environmental data, logistical data, and/or data related to one or more events impacting the operation of the aerial vehicle 112. Additionally or alternatively, in some embodiments, the processor 202 includes hardware, software, firmware, and/or a combination thereof, that causes rendering one or more recommendations generated by the event management engine via one or more electronic interfaces associated with the EMF vehicle apparatus 200 and/or one or more electronic interfaces associated with other computing devices related to the EMF vehicle segment of the EMF. Additionally or alternatively, in some embodiments, the processor 202 includes hardware, software, firmware, and/or a combination thereof, that in real-time updates rendering of a user interface and/or interface element(s) thereof in response to updated data related to the one or more events, one or more recommendations associated with the one or more events, and/or one or more portions of data associated with the operation of the aerial vehicle 112.

In some embodiments, EMF vehicle apparatus 200 includes input/output circuitry 206 that provides output to the user and, in some embodiments, to receive an indication of a user input (e.g., user input generated by a pilot, operator, crew member, and/or passenger). In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202, and/or input/output circuitry 206 comprising a processor, in some embodiments is configured to control one or more functions of one or more user interface elements through computer program instructions (e.g., software and/or firmware) stored on a memory accessible to the processor 202 (e.g., memory 204, and/or the like). In some embodiments, the input/output circuitry 206 includes or utilizes a user-facing application to provide input/output functionality to a service maintainer device and/or other display associated with a user. In some embodiments, the input/output circuitry 206 includes a primary flight display and/or a multi-function display of an aerial vehicle. Additionally or alternatively, in some embodiments, the input/output circuitry 206 includes one or more software-rendered user interface(s) including interface element(s) that depict particular data and/or information, and/or that receive user input.

The communications circuitry 208 includes any means such as a device or circuitry embodied in either hardware or a combination of hardware and software that is configured to receive and/or transmit data from/to a communications network and/or any other computing device, circuitry, or module in communication with the EMF vehicle apparatus 200. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from one or more computing device(s) and/or system(s) of other connected vehicle system(s) 104, travel operation management system(s) 106, and/or environment data system(s) 108, in communication with the EMF vehicle apparatus 200.

The sensor(s) 210 includes hardware, software, firmware, and/or a combination thereof, that supports generation, capturing, aggregating, retrieval, and/or receiving of one or more portions of sensor data. In some embodiments, the sensor(s) 210 includes one or more discrete component(s) of an aerial vehicle. The sensor(s) 210 in some embodiments are affixed to, within, and/or otherwise as a part of an aerial vehicle including or otherwise associated with the EMF vehicle apparatus 200. For example, in some embodiments, one or more of the sensor(s) 210 is/are mounted to the aerial vehicle, such as the aerial vehicle 112. Non-limiting examples of sensor(s) 210 include altimeter(s) (e.g., radio and/or barometric), pressure sensor(s), pilot tube(s), anemometer(s), image camera(s), video camera(s), infrared sensor(s), speed sensor(s), battery sensor(s), fuel level sensor(s), biological sensor(s) and/or the like. In some embodiments, the sensor(s) 210 are integrated with, or embodied by, one or more of the aerial vehicle onboard system(s) 102 such that the sensor(s) 210 generate, collect, monitors, and/or otherwise obtain data related to the one or more aerial vehicle onboard system(s) 102.

In some embodiments, the sensor(s) 210 additionally or alternatively include any of a myriad of sensor(s) conventionally associated with drone(s), helicopter(s), and/or other urban air mobility aerial vehicle(s). Additionally or alternatively, in some embodiments, the sensor(s) 210 include one or more high-sensitivity sensor(s) to facilitate enable high accuracy capturing of data in certain circumstances. For example, in some embodiments, the sensor(s) 210 includes one or more high-sensitivity sensor(s) that capture detailed data while an aerial vehicle is in flight. Such higher fidelity sensor(s) may supplement and/or, in other embodiments, replace the data captured by such sensor(s) with lower fidelity.

In some embodiments, the sensor(s) 210 includes hardware, software, firmware, and/or a combination thereof, embodying one or more navigation sensor(s). In some embodiments, the navigation sensor(s) includes a global positioning satellite (GPS) tracking chip and/or the like enabling location services to be requested and/or determined for a particular aerial vehicle. Additionally or alternatively, in some embodiments, the sensor(s) 210 includes hardware, software, firmware, and/or any combination thereof, embodying inertial navigation sensor(s) that measures speed, acceleration, orientation, and/or position-related data in a 3D environment. Additionally or alternatively, in some embodiments, the sensor(s) 210 includes one or more camera(s) associated with a synthetic vision system (SVS). In some such embodiments, such an SVS camera captures image data representation(s) of the real-world environment around an aerial vehicle for use in generating corresponding user interface(s) depicting he captured image data, augmenting such image data, and/or otherwise providing data to enable an operator to acquire situational awareness based at least in part on the captured image data. It will be appreciated that, in some embodiments, the sensor(s) 210 includes a separate processor, specially configured field programmable gate array (FPGA), or a specially programmed application specific integrated circuit (ASIC).

The vehicle control circuitry 212 includes hardware, software, firmware, and/or a combination thereof, that supports functionality associated with navigating and/or controlling an aerial vehicle 112. In some embodiments, vehicle control circuitry 212 can control and/or configure one or more of the aerial onboard system(s) 102. In some embodiments, vehicle control circuitry 212 includes hardware, software, firmware, and/or a combination thereof, that receives flight detail data (e.g., embodying a flight plan), location service(s) data representing a location of the aerial vehicle 112, and/or the like. Additionally or alternatively, in some embodiments, the vehicle control circuitry 212 includes hardware, software, firmware, and/or a combination thereof, that depicts interface element(s) representing at least a flight path or indication where the aerial vehicle 112 is currently traveling and/or should travel.

Additionally or alternatively, in some embodiments, the vehicle control circuitry 212 includes hardware, software, firmware, and/or a combination thereof, that autonomously control(s) one or more component(s) of an aerial vehicle. In some such embodiments, the vehicle control circuitry 212 autonomously control(s) one or more physical component(s) of the aerial vehicle 112 to facilitate movement of the aerial vehicle 112 along a particular flight path. Alternatively or additionally, in some embodiments, the vehicle control circuitry 212 includes hardware, software, firmware, and/or a combination thereof, that semi-autonomously control(s) one or more component(s) of an aerial vehicle, for example where certain aspects of the operation of the aerial vehicle are autonomously performed and others (e.g., directional control) is/are controlled by a user (e.g., a pilot). Alternatively or additionally, in some embodiments, the vehicle control circuitry 212 includes hardware, software, firmware, and/or a combination thereof, that receives pilot input for controlling one or more component(s) of an aerial vehicle, for example via vehicle flight control(s) to alter speed and/or direction of the aerial vehicle. Alternatively or additionally, in some embodiments, the vehicle control circuitry 212 includes hardware, software, firmware, and/or a combination thereof, that causes changes to an operational mode of an aerial vehicle, for example autonomously based at least in part on one or more data-driven event(s) and/or triggers, or in response to user input initiating the change in operational mode. It will be appreciated that, in some embodiments, the vehicle control circuitry 212 includes a separate processor, specially configured field programmable gate array (FPGA), or a specially programmed application specific integrated circuit (ASIC).

The event management circuitry 214 includes hardware, software, firmware, and/or a combination thereof, that supports functionality associated with the event management engine associated with the EMF. For example, the event management circuitry 214 can, at least in part, execute one or more portions of program code associated with the methods and operations of the event management engine. For example, the event management circuitry 214 includes hardware, software, firmware, and/or a combination thereof, that can receive and/or analyze one or more portions of model input comprising travel event data, vehicle sensor data, vehicle system data, air traffic data, environmental data, logistical data, personnel data, and/or any other relevant data related to a particular aerial vehicle 112. Additionally, in various embodiments, the event management circuitry 214 includes hardware, software, firmware, and/or a combination thereof, that can be employed to train and/or retrain the event management engine based at least in part on prior model input comprising one or more prior events, one or more prior portions of prior travel event data, one or more portions of prior vehicle sensor data, one or more prior operator inputs, and/or one or more prior vehicle operation constraints. In this regard, the event management circuitry 214 includes hardware, software, firmware, and/or a combination thereof, that can cause the storage of one or more portions of data associated with the event management engine. Additionally or alternatively, the event management circuitry 214 includes hardware, software, firmware, and/or a combination thereof, that can interface with, control, configure, and/or otherwise operate one or more legacy vehicle systems, legacy software, and/or legacy hardware associated with an aerial vehicle 112 based at least in part on the model output (e.g., recommendations) generated by the event management engine.

It will be appreciated that, further in some embodiments, two or more of the sets of circuitries 202-214 are combinable. Alternatively or additionally, in some embodiments, one or more of the sets of circuitry 202-214 perform some or all of the functionality described associated with another component. For example, in some embodiments, one or more of the sets of circuitry 202-214 are combined into a single component embodied in hardware, software, firmware, and/or a combination thereof. For example, in some embodiments, two or more of the vehicle control circuitry 212 and event management circuitry 214 are embodied by a single set of circuitry that performs the combined operations of the individual sets of circuitry. Similarly, in some embodiments, one or more of the sets of circuitry, for example vehicle control circuitry 212 and/or event management circuitry 214 is/are combined with the processor 202, such that the processor 202 performs one or more of the operations described above with respect to each of these other sets of circuitry.

Figure 3:
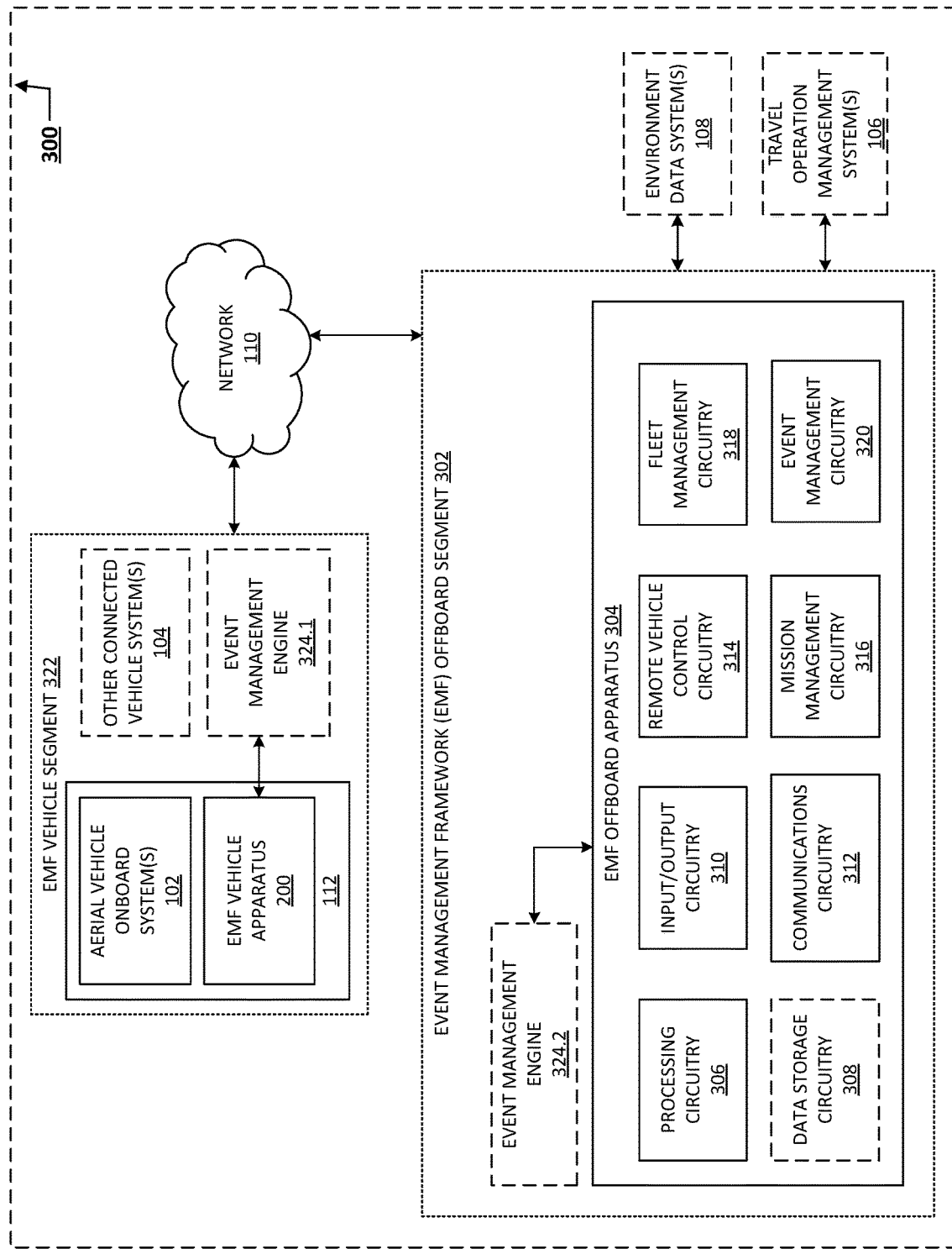
FIG. 3 illustrates an example EMF in accordance with at least some example embodiments of the present disclosure.

FIG. 3 illustrates an example EMF in accordance with at least some example embodiments of the present disclosure. Specifically, FIG. 3 depicts an EMF 300. As depicted, FIG. 3 depicts the various operational segments, component systems, and apparatuses embodied by the EMF 300. For example, the EMF 300 includes an EMF offboard segment 302 comprising an EMF offboard apparatus 304 and the EMF vehicle segment 322 comprising the aerial vehicle 112 and/or the other connected vehicle system(s) 104, and the event management engine 324. In various embodiments, the EMF offboard segment 302 can integrate with the environment data system(s) 108 and/or the travel operation management system(s) 106 and can communicate with the EMF vehicle segment 322 via the communications network 110. For example the EMF offboard segment 302 can communicate with the EMF vehicle segment 322 through one or more of the component parts of the EMF offboard apparatus 304 (e.g., communications circuitry 312) and one or more component parts of the EMF vehicle apparatus 200 (e.g., communications circuitry 208) via the communications network 110.

As will be further detailed below, due to the distributed nature of the various embodiments of the present disclosure, the EMF 300 and the operational segments comprised therein can be configured to freely pass data via one or more communications networks (e.g., communications network 110) in order to optimally delegate one or more operations described herein to one or more respective computing devices associated with the EMF 300. This delegation of operations provides the benefit of optimizing the capabilities of particular a particular aerial vehicle 112 based at least in part on the processing power associated with the particular aerial vehicle 112. As will be appreciated, the delegation of certain methods, procedures, calculations, computations, configurations, predictions, and/or the like throughout the distributed operational segments of the EMF 300 reduces the load on the aerial vehicle onboard system(s) 102 of the aerial vehicle 112 as well as the load on the computing devices (e.g., the EMF offboard apparatus 304) of the EMF offboard segment 302. Furthermore, it will be appreciated that while the majority of the example embodiments described herein are directed to an EMF 300 that is distributed across a first and second respective operational segment (e.g., the EMF offboard segment 302 and the EMF vehicle segment 322), various embodiments of the EMF 300 can be distributed across two or more of the same or similar type of operational segments. For example, the EMF 300 may be distributed across two or more EMF offboard segments 302 and/or two or more EMF vehicle segments 322.

As depicted in FIG. 3, the EMF offboard apparatus 304 comprises processing circuitry 306, data storage circuitry 308, input/output circuitry 310, communications circuitry 312, remote vehicle control circuitry 314, mission management circuitry 316, and/or fleet management circuitry 318, event management circuitry 320. In some embodiments, other elements of the EMF offboard apparatus 304 provide or supplement the functionality of another particular set of circuitry. For example, the processing circuitry 306 in some embodiments provides processing functionality to any of the other sets of circuitry, the data storage circuitry 308 provides storage functionality to any of other the sets of circuitry, the communications circuitry 312 provides network interface functionality to any of the other sets of circuitry, and/or the like. Additionally or alternatively, in various embodiments, the EMF offboard apparatus 304 is configured to control, configure, and/or otherwise operate one or more of the circuitries 202-214 of the EMF vehicle apparatus 200 illustrated in FIG. 2 via the communications network 110. Additionally or alternatively, the EMF offboard apparatus 304 is configured to control, configure, and/or otherwise operate the one or more aerial vehicle onboard system(s) 102 associated with the aerial vehicle 112, as well as the other connected vehicle system(s) 104.

In some embodiments, the processing circuitry 306 (and/or co-processor or any other processing circuitry assisting or otherwise associated with the processor) is/are in communication with the data storage circuitry 308 via a bus for passing information among components of the EMF offboard apparatus 304. In some embodiments, for example, the data storage circuitry 308 is non-transitory and includes for example, one or more volatile and/or non-volatile memories. In other words, for example, the data storage circuitry 308 in some embodiments includes or embodies an electronic storage device (e.g., a computer readable storage medium). In some embodiments, the data storage circuitry 308 is configured to store information, data, content, applications, instructions, or the like, for enabling the EMF offboard apparatus 304 to carry out various functions in accordance with example embodiments of the present disclosure.

In various embodiments, the processing circuitry 306 is embodied in a number of different ways. For example, in some example embodiments, the processing circuitry 306 includes one or more processing devices configured to perform independently. Additionally or alternatively, in some embodiments, the processing circuitry 306 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the EMF offboard apparatus 304, and/or one or more remote or "cloud" processor(s) external to the EMF offboard apparatus 304.

In an example embodiment, the processing circuitry 306 is configured to execute instructions stored in the data storage circuitry 308 or otherwise accessible to the processing circuitry 306. Alternatively or additionally, the processing circuitry 306 in some embodiments is configured to execute hard-coded functionality. As such, whether configured by hardware or software methods, or by a combination thereof, the processing circuitry 306 represents an entity (e.g., physically embodied in circuitry) capable of performing operations according to an embodiment of the present disclosure while configured accordingly. Alternatively or additionally, as another example in some example embodiments, when the processing circuitry 306 is embodied as an executor of software instructions, the instructions specifically configure the processing circuitry 306 to perform the algorithms embodied in the specific operations described herein when such instructions are executed.

As one particular example embodiment, the processing circuitry 306 is configured to perform various operations associated with executing one or more recommendations generated by the event management engine 324 associated with the EMF 300, for example as described with respect to operating and/or reconfiguring the aerial vehicle onboard system(s) 102 in FIG. 1 and/or as described further herein. In some embodiments, the processing circuitry 306 includes hardware, software, firmware, and/or a combination thereof, that receives data including one or more portions of travel event data, vehicle sensor data, environmental data, logistical data, and/or data related to one or more events impacting the operation of the aerial vehicle 112. Additionally or alternatively, in some embodiments, the processing circuitry 306 includes hardware, software, firmware, and/or a combination thereof, that causes rendering one or more recommendations generated by the event management engine 324 via one or more electronic interfaces associated with the EMF offboard apparatus 304 and/or one or more electronic interfaces associated with other computing devices related to the EMF offboard segment 302 of the EMF 300. Additionally or alternatively, in some embodiments, the processing circuitry 306 includes hardware, software, firmware, and/or a combination thereof, that in real-time updates rendering of a user interface and/or interface element(s) thereof in response to updated data related to the one or more events, one or more recommendations associated with the one or more events, and/or one or more portions of data associated with the operation of the aerial vehicle 112.

In some embodiments, the EMF offboard apparatus 304 includes data storage circuitry 308 that is configured to store, update, retrieve, delete, and/or otherwise one or more portions of data associated with an EMF 300. As described herein, the data storage circuitry 308 can store and/or retrieve one or more computer program instructions associated with the one or more operations described herein. In various embodiments, the data storage circuitry 308 can embody, or be integrated with, a server system, a cloud storage system, a collection of databases, one or more data stores, and/or any other type of non-transitory storage medium. In certain embodiments, the data storage circuitry 308 can store one or more portions of data obtained from the travel operation management system(s) 106 and/or the environment data system(s) 108, as well as any data related to any events associated with the aerial vehicle 112. Additionally, the data storage circuitry is configured to store, update, retrieve, delete, and/or otherwise maintain any training data associated with the event management engine 324.

In some embodiments, EMF offboard apparatus 304 includes input/output circuitry 310 that provides output to the user and, in some embodiments, to receive an indication of a user input (e.g., user input generated by a remote operator, ground crew member, and/or the like). In some embodiments, the input/output circuitry 310 is in communication with the processing circuitry 306 to provide such functionality. The input/output circuitry 310 may comprise one or more user interface(s) and in some embodiments includes a display that comprises the interface(s) rendered as a web user interface, an application user interface, a user device, a backend system, or the like. In some embodiments, the input/output circuitry 310 also includes a keyboard, a mouse, a joystick, a touch screen, touch areas, soft keys, a microphone, a speaker, or other input/output mechanisms. The processing circuitry 306, and/or input/output circuitry 310 comprising a processor, in some embodiments is configured to control one or more functions of one or more user interface elements through computer program instructions (e.g., software and/or firmware) stored on a memory accessible to the processing circuitry 306 (e.g., data storage circuitry 308, and/or the like). In some embodiments, the input/output circuitry 310 includes or utilizes a user-facing application to provide input/output functionality to a service maintainer device and/or other display associated with a user. In some embodiments, the input/output circuitry 310 includes a primary flight display and/or a multi-function display of an aerial vehicle. Additionally or alternatively, in some embodiments, the input/output circuitry 310 includes one or more software-rendered user interface(s) including interface element(s) that depict particular data and/or information, and/or that receive user input.

The communications circuitry 312 includes any means such as a device or circuitry embodied in either hardware or a combination of hardware and software that is configured to receive and/or transmit data from/to a communications network and/or any other computing device, circuitry, or module in communication with the EMF offboard apparatus 304. In this regard, the communications circuitry 312 includes, for example in some embodiments, a network interface for enabling communications with a wired or wireless communications network. Additionally or alternatively in some embodiments, the communications circuitry 312 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 312 includes circuitry for interacting with the antenna(s) and/or other hardware or software to cause transmission of signals via the antenna(s) or to handle receipt of signals received via the antenna(s). In some embodiments, the communications circuitry 312 enables transmission to and/or receipt of data from one or more computing device(s) and/or system(s) of other connected vehicle system(s) 104, travel operation management system(s) 106, and/or environment data system(s) 108, in communication with the EMF offboard apparatus 304.

The remote vehicle control circuitry 314 includes hardware, software, firmware, and/or a combination thereof, that supports functionality associated with navigating and/or controlling an aerial vehicle 112 remotely from the EMF offboard segment 302. In some embodiments, remote vehicle control circuitry 314 can control and/or configure one or more of the aerial onboard system(s) 102 associated with the aerial vehicle 112. In some embodiments, remote vehicle control circuitry 314 includes hardware, software, firmware, and/or a combination thereof, that receives flight detail data (e.g., embodying a flight plan), location service(s) data representing a location of the aerial vehicle 112, and/or the like. Additionally or alternatively, in some embodiments, the remote vehicle control circuitry 314 includes hardware, software, firmware, and/or a combination thereof, that depicts interface element(s) representing at least a flight path or indication where the aerial vehicle 112 is currently travelling and/or should travel.

Additionally or alternatively, in some embodiments, the remote vehicle control circuitry 314 includes hardware, software, firmware, and/or a combination thereof, that autonomously control(s) one or more component(s) of an aerial vehicle 112. In some such embodiments, the remote vehicle control circuitry 314 autonomously control(s) one or more physical component(s) of the aerial vehicle 112 to facilitate movement of the aerial vehicle 112 along a particular flight path. Alternatively or additionally, in some embodiments, the remote vehicle control circuitry 314 includes hardware, software, firmware, and/or a combination thereof, that semi-autonomously control(s) one or more component(s) of an aerial vehicle 112, for example where certain aspects of the operation of the aerial vehicle 112 are autonomously performed and others (e.g., directional control) is/are controlled by a user (e.g., a remote operator). Alternatively or additionally, in some embodiments, the remote vehicle control circuitry 314 includes hardware, software, firmware, and/or a combination thereof, that receives remote operator input for controlling one or more component(s) of an aerial vehicle 112, for example via vehicle flight control(s) to alter speed and/or direction of the aerial vehicle 112. Alternatively or additionally, in some embodiments, the remote vehicle control circuitry 314 includes hardware, software, firmware, and/or a combination thereof, that causes changes to an operational mode of an aerial vehicle 112, for example autonomously based at least in part on one or more data-driven event(s) and/or triggers, or in response to user input initiating the change in operational mode. It will be appreciated that, in some embodiments, the remote vehicle control circuitry 314 includes a separate processor, specially configured field programmable gate array (FPGA), or a specially programmed application specific integrated circuit (ASIC).

The mission management circuitry 316 includes hardware, software, firmware, and/or a combination thereof, that supports functionality associated with generating, receiving, configuring, and/or otherwise managing data related to the mission of one or more aerial vehicle(s) 112 associated with the EMF 300. For example, the mission management circuitry 316 is configured to generate and/or manage one or more vehicle operation constraints associated with the operation of an aerial vehicle 112. Vehicle operation constraints can include, but are not limited to, constraints related to the configuration of one or more vehicle systems associated with the aerial vehicle 112, constraints related to a flight plan (e.g., destinations, waypoints, flight paths, arrival/departure schedules and/or procedures, traffic management constraints and/or the like), power consumption constraints (e.g., battery and/or fuel consumption thresholds), specific vehicle constraints (e.g., performance capabilities associated with one or more vehicle systems of the aerial vehicle 112), environmental constraints (e.g., regulations related to operating an aerial vehicle 112 in an urban environment), and/or the like. In various embodiments, the one or more vehicle operation constraints can be rendered via a respective electronic interface associated with the EMF vehicle apparatus 200 and/or the EMF offboard apparatus 304.

Additionally, the mission management circuitry 316 includes hardware, software, firmware, and/or a combination thereof, that supports functionality associated with handling one or more logistical aspects of the one or more aerial vehicle(s) 112 associated with the EMF 300. Non-limiting examples include monitoring the logistical aspects of one or more destinations (e.g., one or more airports and/or vertiports) associated with a flight plan of the aerial vehicle 112. For example, the mission management circuitry 316 can monitor occupancy (e.g., available facilities to accommodate an aerial vehicle 112) associated with a destination. Additionally or alternatively, the mission management circuitry 316 can determine logistical aspects related to potential destinations such as nearby health and safety services. For example, if a personnel health emergency occurs on an aerial vehicle 112, the mission management circuitry 316 can assist in determining an optimal alternate landing destination by identifying landing destinations that have health and safety services nearby. As such, data generated by the mission management circuitry 316 can be used by the event management engine 324 to generate recommendations comprising alternate landing destination.

The mission management circuitry 316 is also configured to keep the event management engine 324 (as well as one or more remote operators) abreast of any situations that may impact the operation of an aerial vehicle 112. As a non-limiting example, in the event that a temporary flight restriction has been enforced in a geographical location which the aerial vehicle 112 was originally meant to travel through, the mission management circuitry 316 can transmit data related to the temporary flight restriction to the event management engine 324. In this scenario, the event management engine 324 can then generate recommendations to optimally update one or more vehicle operation constraints configured to alter the navigation of the aerial vehicle 112.

The fleet management circuitry 318 includes hardware, software, firmware, and/or a combination thereof, that supports functionality associated with the management of a fleet of vehicles (e.g., aerial vehicle(s) 112) associated with an enterprise related to the EMF 300. In various embodiments, the fleet management circuitry 318 includes hardware, software, firmware, and/or a combination thereof, that can monitor the location, operational status, health, performance, and/or capabilities of one or more aerial vehicle(s) 112 associated with a particular EMF 300. In this regard, the fleet management circuitry 318 can generate one or more portions of fleet management data configured as model input for the event management engine 324.

In various embodiments, the event management engine 324 can be employed to generate one or more recommendations related to the management of the fleet of vehicles associated with the EMF 300. Non-limiting examples include generating recommendations for scheduling various aerial vehicle(s) 112, assigning various aerial vehicle(s) 112 to particular missions, determining optimal aerial vehicle(s)

112 to be deployed based at least in part on the particular characteristics of the aerial vehicle(s) 112, commissioning and/or decommissioning various aerial vehicle(s) 112 based at least in part on one or more health metrics (e.g., current operational status and/or performance of the aerial vehicle(s) 112) related to one or more vehicle systems associated with the aerial vehicle(s) 112, and/or the like. Additionally, fleet management circuitry 318 in conjunction with the event management engine 324 can determine a priority level related to one or more missions being executed by one or more aerial vehicle(s) 112 associated with the fleet of vehicles associated with an enterprise related to the EMF 300. For example, based on the respective priority level associated with the one or more missions, the event management engine 324 may generate a recommendation to alter one or more departure/arrival schedules associated with the aerial vehicle(s) 112 in the fleet of vehicles.

The event management circuitry 320 includes hardware, software, firmware, and/or a combination thereof, that supports functionality associated with the event management engine 324 associated with the EMF 300. For example, the event management circuitry 320 can, at least in part, execute one or more portions of program code associated with the methods and operations of the event management engine 324. For example, the event management circuitry 320 includes hardware, software, firmware, and/or a combination thereof, that can receive and/or analyze one or more portions of model input comprising travel event data, vehicle sensor data, vehicle system data, air traffic data, environmental data, logistical data, personnel data, and/or any other relevant data related to a particular aerial vehicle 112. Travel event data can be generated in part by one or more components of the aerial vehicle 112, one or more components of the EMF offboard apparatus 304, and/or one or more of the environment data system(s) 108 and the travel operation management system(s) 106 associated with the EMF offboard segment 302.

Additionally, in various embodiments, the event management circuitry 320 includes hardware, software, firmware, and/or a combination thereof, that can be employed to train and/or retrain the event management engine 324 based at least in part on prior model input comprising one or more prior events, one or more prior portions of prior travel event data, one or more portions of prior vehicle sensor data, one or more prior operator inputs, and/or one or more prior vehicle operation constraints. In this regard, the event management circuitry 320 includes hardware, software, firmware, and/or a combination thereof, that can cause the storage of one or more portions of data associated with the event management engine 324. Additionally or alternatively, the event management circuitry 320 includes hardware, software, firmware, and/or a combination thereof, that can interface with, control, configure, and/or otherwise operate one or more legacy vehicle systems, legacy software, and/or legacy hardware associated with an aerial vehicle 112 based at least in part on the model output (e.g., recommendations) generated by the event management engine 324.

It will be appreciated that, further in some embodiments, two or more of the sets of circuitries 306-320 are combinable. Alternatively or additionally, in some embodiments, one or more of the sets of circuitry 306-320 perform some or all of the functionality described associated with another component. For example, in some embodiments, one or more of the sets of circuitry 306-320 are combined into a single component embodied in hardware, software, firmware, and/or a combination thereof. For example, in some embodiments, two or more of the remote vehicle control circuitry 314 and event management circuitry 320 are embodied by a single set of circuitry that performs the combined operations of the individual sets of circuitry. Similarly, in some embodiments, one or more of the sets of circuitry, for example remote vehicle control circuitry 314 and/or event management circuitry 320 is/are combined with the processing circuitry 306, such that the processing circuitry 306 performs one or more of the operations described above with respect to each of these other sets of circuitry.

The event management engine 324 can employ one or more machine learning techniques and can be deployed in various configurations. For instance, the event management engine 324 can employ one or more machine reasoning techniques to make inferences, decisions, and/or recommendations with respect to the model input. Additionally or alternatively, the event management engine 324 can be configured as a rules-based engine that generates recommendation based at least in part on one or more rule sets associated with the EMF 300. For instance, the event management engine 324 can comprise a binary rule set, and/or a predetermined rule set that can be used to determine one or more recommendations based at least in part on the model input. In various embodiments, the one or more rule sets can comprise one or more operational thresholds related to the operation of the one or more vehicle system(s) associated with a particular aerial vehicle 112. Additionally or alternatively, the one or more rule sets can comprise one or more predetermined contingencies associated with one or more predefined events. Additionally or alternatively, the event management engine 324 can comprise one or more look-up tables and/or one or more machine learning algorithms configured and/or trained one on or more training data sets related to a specific domain of applicable knowledge (e.g., the aerospace domain).

In various embodiments, the event management engine 324 can be configured as a deep learning model. For instance, the event management engine 324 can be configured as an artificial neural network (ANN), a convolutional neural network (CNN), a recurrent neural network (RNN), or any other type of specially trained neural network. The event management engine 324 can be iteratively trained based at least in part on one or more prior events related to one or more aerial vehicle(s) 112 associated with the EMF 300. For example, prior model input comprising one or more prior events, one or more prior portions of prior travel event data, one or more portions of prior vehicle sensor data, one or more prior operator inputs, and/or one or more prior vehicle operation constraints that was used to generate one or more recommendations can be stored by the EMF 300. Additionally, any recommendations generated in response to the prior model output, as well as any data related to one or more particular recommendations that were employed to address a particular event can be stored by the EMF 300. Any such data stored by the EMF 300 can be used to train and/or retrain the event management engine 324. In this way, the event management engine 324 can be iteratively updated and retrained to generate improved recommendations related to future events associated with the one or more aerial vehicle(s) 112 associated with the EMF 300.

In various embodiments, the recommendations generated by the event management engine 324 can be configured to be human-readable and can be rendered via a respective electronic interface associated with one or more computing devices such as, for example an EMF vehicle apparatus 200 associated with the aerial vehicle 112 and/or an EMF offboard apparatus 304 associated with the EMF 300. Recommendations can be confirmed or denied by an operator of the aerial vehicle 112, where confirmation can be a selection indication indicating acceptance or rejection of the recommendation generated via one or more computing devices. In circumstances in which one or more recommendations is accepted, the confirmation causes execution of the one or more recommendations. Executing a recommendation comprises operating one or more systems associated with the aerial vehicle 112 (e.g., one or more aerial vehicle onboard system(s) 102) to control the operation of the aerial vehicle 112. In some embodiments, a recommendation must be confirmed by a human operator or pilot responsible for operating the aerial vehicle 112. In various other embodiments, recommendations can be automatically executed depending on the criticality of the corresponding event impacting the operation of the aerial vehicle 112.

Non-limiting examples of recommendations can include a recommendation to execute an emergency landing, execute a controlled landing in a predetermined landing zone, switch a current operational mode of the aerial vehicle 112 (e.g., switch the aerial vehicle into an economy flight mode from a normal operational mode), adjust one or more operation constraints (e.g., mission goals, flight plans, destinations, waypoints, and/or the like), alter a current flight path of aerial vehicle 112 (e.g., alter a current heading, altitude, speed, and/or the like), and/or reconfigure one or more vehicle systems (e.g., one or more aerial vehicle onboard system(s) 102) associated with the aerial vehicle 112.

The event management engine 324 can be distributed across the EMF 300. As depicted in FIG. 3, the event management engine 324 can be distributed between the EMF vehicle segment 322 and the EMF offboard segment 302 and, as such, can receive model input from the EMF vehicle segment 322 and/or the EMF offboard segment 302. In some embodiments, the event management engine 324 is divided into functionality provided by two or more distributed components, for example the event management engine 324.1 and the event management engine 324.2 depicted in FIG. 3. In this regard, the event management engine 324.1 and the event management engine 324.2 may each be specially configured to perform at least a portion of the functionality described with respect to the event management engine 324. In some embodiments, the functionality described with respect to the event management engine 324 is performed by a single computing entity. For example, the single computing entity may be embodied entirely onboard the vehicle (e.g., the EMF vehicle apparatus 200 associated with the aerial vehicle 112) and working in conjunction with the event management engine 324.1 as depicted in FIG. 3. In other embodiments, the single computing entity is embodied entirely by a ground system (e.g., the EMF offboard apparatus 304) and working in conjunction with the event management engine 324.2 as depicted in FIG. 3.

Distributing the event management engine 324 across the EMF 300 provides the benefit of distributing the computational load and processing power required to generate recommendations and/or to act upon the generated recommendations, while simultaneously enabling the event management engine 324 to operate as a single decision maker (e.g., as "one brain" for purposes of such decision-making). Additionally or alternatively, such a distributed nature enables performance of emergency determinations onboard a vehicle, in some embodiments, without sacrificing the enhanced processing and/or review capabilities provided by enabling review or further processing via a ground system. For example, distributing the event management engine 324 across the EMF 300 provides the benefit of allowing an aerial vehicle 112 associated with the EMF vehicle segment 322 to mitigate time-sensitive emergency scenarios without having to first communicate with and/or rely upon ground control systems (e.g., the ground control systems associated with the EMF offboard segment 302).

The event management engine 324 can be configured to classify the criticality of one or more events associated with an aerial vehicle 112. For instance, once the event management engine 324 determines that one or more events that can impact the operation of the aerial vehicle 112 is occurring, the event management engine 324 can determine an event severity level associated with the one or more events. As a non-limiting example, the event management engine 324 can classify one or more events as having a low severity level, a moderate severity level, a high severity level, a critical severity level, and/or the like. One or more event severity thresholds can be predetermined and incorporated by the event management engine 324 (e.g., comprised in a predefined rule set associated with the event management engine 324) such that when a respective event severity level associated with the one or more events satisfies the one or more event severity thresholds the event management engine 324 can generate one or more recommendations and/or trigger one or more actions to address the one or more events.

The event management engine 324 can also determine a respective event type associated with one or more events impacting the operation of the aerial vehicle 112. One or more event types can be determined based in part on one or more portions of travel event data indicative of a nominal scenario, an emergency scenario, a hazard scenario, a scenario that alters the voyage of the aerial vehicle, and/or a change in the operation of a system affecting control of the aerial vehicle. In various embodiments, at least a portion of the travel event data is based at least in part on vehicle sensor data collected, measured, calculated, and/or otherwise generated by one or more sensors (e.g., one or more sensors 210) associated with the aerial vehicle 112. A few non-limiting examples of event types that can be associated with a respective event include, an emergency event type, a hazard event type, a mechanical failure event type, a logistical event type, an environmental event type, an optimization event type, a personnel health event type, and/or the like.

In some embodiments, event types can be associated with a predefined event severity level. For example, in some embodiments, a logistical event type can be automatically associated with a low severity level. However, the event management engine 324 may determine that a particular event associated with a logistical event type has a high event severity level due to various respective circumstances. As a non-limiting example, the event management engine 324 may typically classify a situation in which a destination airport has accrued too much flight traffic and the aerial vehicle 112 must enter an extended holding pattern as a logistical event with a low severity. However, if the aerial vehicle 112 was experiencing critically low fuel/battery levels, entering the extended holding pattern and/or diverting to another airport may not be feasible. Thus, the event management engine 324 may classify that particular logistical event as having a high severity level and may generate one or more respective recommendations for addressing the event.

In various embodiments, the event management engine 324 can generate a set of recommendations based at least in part on a single event or based at least in part on two or more distinct events that may impact the operation of an aerial vehicle 112. In scenarios in which two or more distinct events are occurring that may impact the operation of the aerial vehicle 112, one or more respective recommendations comprised in the set of recommendations may address only one of the two or more distinct events. Additionally or alternatively, one or more respective recommendations comprised in the set of recommendations may address multiple distinct events of the two or more distinct events. The event management engine 324 can determine which recommendations of the set of recommendation will have the greatest positive effect on the current situation associated with the aerial vehicle 112. For example, in some embodiments, the event management engine 324 can rank one or more recommendations of the set of recommendations based at least in part on a predicted result associated with the execution of the one or more recommendations.

For instance, a first recommendation can be ranked higher relative to a second recommendation based at least in part on a predicted result associated with the first recommendation. The predicted result can reflect a probability that executing the first recommendation will positively mitigate, correct, and/or otherwise successfully address the one or more events impacting the operation of the aerial vehicle 112. In some embodiments, the event management engine 324 can determine which of the one or more recommendations of the set of recommendations to render (e.g., via a respective electronic interface associated with the EMF vehicle apparatus 200 and/or the EMF offboard apparatus 304) based at least in part on the respective ranks of the one or more recommendations.

Because the event management engine 324 can detect two or more distinct events impacting the operation of the aerial vehicle 112, and because the two or more distinct events can be classified as having distinct event types and/or differing event severity levels, the event management engine 324 can determine an overall event criticality level associated with the two or more distinct events. For example, the overall event criticality level can be a cumulative representation of the potential impact the two or more distinct events may have on the operation of the aerial vehicle 112. Said another way, the two or more distinct events associated with two or more respective event severity levels can be considered simultaneously such that the respective severity levels are combined.

As a non-limiting example, in a circumstance in which two distinct events are occurring simultaneously and where the two distinct events comprise a first distinct event with a low severity level and a second distinct event with a moderate severity level, the event management engine 324 can determine that the two distinct events have an overall event criticality level of "high." As such, two or more distinct events associated with relatively low severity levels may be determined to have an overall event criticality level that satisfies a predetermined event severity threshold and, accordingly, the event management engine 324 may execute one or more actions based at least in part on the overall event critically level. In various embodiments, the event management engine 324 can generate one or more recommendations based at least in part on an overall event criticality level associated with two or more distinct events impacting the operation of the aerial vehicle 112. The one or more recommendations can be generated to address one or more respective distinct events of the two or more distinct events.

Based at least in part on the criticality of one or more events impacting the operation of an aerial vehicle 112, the event management engine 324 can determine whether the one or more events should be managed by the EMF vehicle segment 322 or the EMF offboard segment 302. Determining whether the EMF vehicle segment 322 should manage the event can be based at least in part on various factors including, but not limited to, an event severity level associated with the one or more events, an event type associated with the one or more events, the computational processing capabilities of the one or more aerial vehicle onboard system(s) 102 associated with the aerial vehicle 112, the computational processing capabilities of the EMF vehicle apparatus 200, and/or the computational processing capabilities of the EMF offboard apparatus 304. In this way, the event management engine 324 can determine which respective computing devices associated with the EMF vehicle segment 322 and/or the EMF offboard segment 302 are best qualified to make decisions, generate recommendations, and/or assume control of the one or more vehicle systems (e.g., aerial vehicle onboard system(s) 102) of the aerial vehicle 112.

Figure 4:
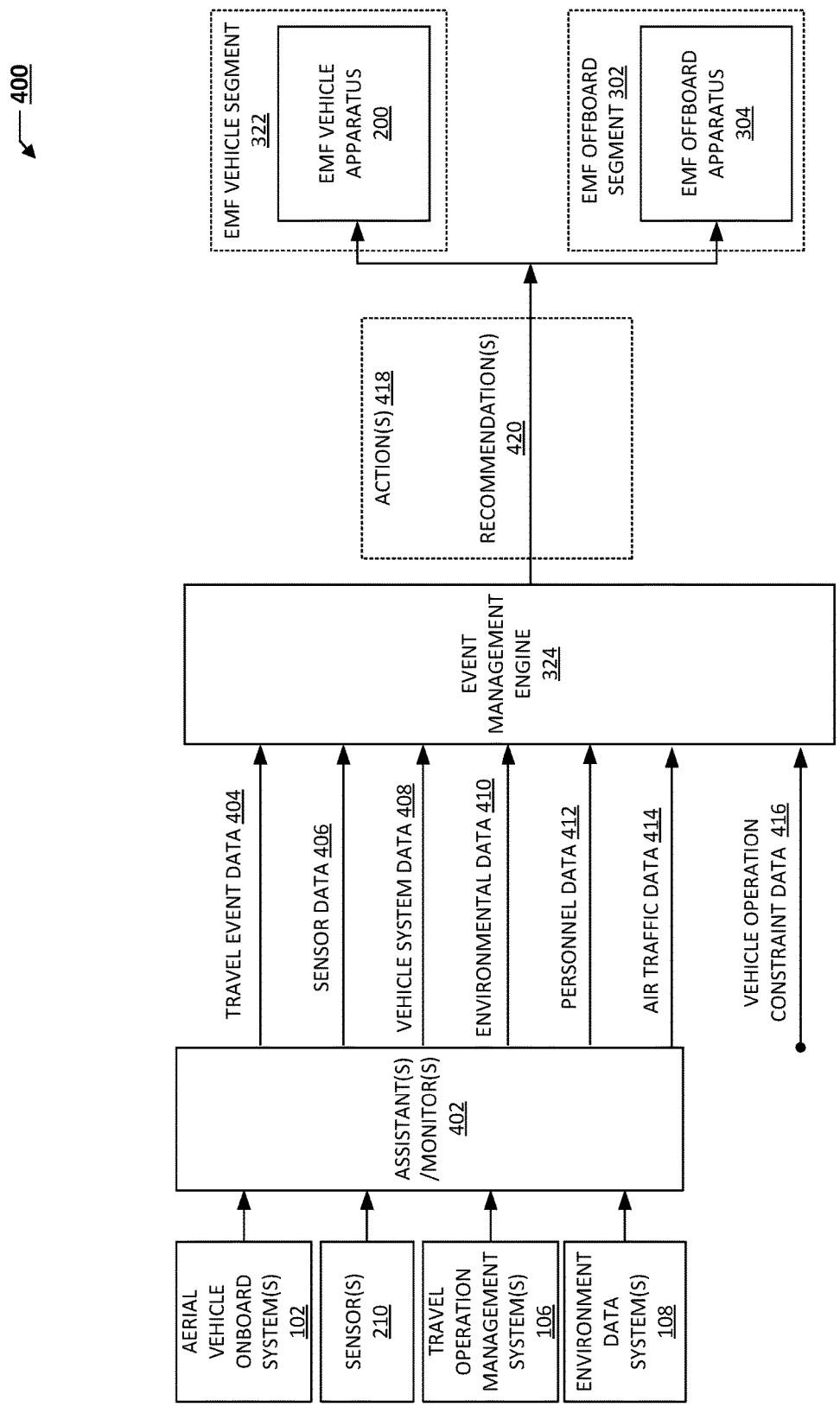
FIG. 4 illustrates a dataflow diagram for an example system that enables event management for one or more events impacting the operation of a vehicle configured in accordance with at least some example embodiments of the present disclosure.

FIG. 4 illustrates a dataflow diagram for an example system that enables event management for one or more events impacting the operation of an aerial vehicle configured in accordance with at least some example embodiments of the present disclosure. Specifically, FIG. 4 depicts a system 400 configured to manage one or more events impacting the operation of a vehicle (e.g., aerial vehicle 112) in accordance with one or more embodiments of the present disclosure. In various embodiments, the system 400 can interact, integrate, and/or can be embodied by the EMF 300. For instance, in various embodiments, the system 400 can be a subsystem of the EMF 300.

The system 400 depicts one or more assistant(s)/monitor(s) 402 which, as will be described, can generate, monitor, collect, compile, measure, analyze, and/or otherwise obtain various types of data associated with the operation of a vehicle (e.g., aerial vehicle 112), and transmit the various types of data to the event management engine 324 as model input. For example, the assistant(s)/monitor(s) 402 can generate, monitor, collect, compile, measure, analyze, and/or otherwise obtain the various types of data from one or more sensor(s) and/or one or more system(s) associated with the vehicle (e.g., aerial vehicle 112). As shown, the assistant(s)/monitor(s) 402 can integrate with, or be embodied by, one or more sensor(s) and/or one or more system(s) including, but not limited to, one or more aerial vehicle onboard system(s) 102, one or more sensor(s) 210, one or more travel operation management system(s) 106, and/or one or more environmental system(s) 108. In various embodiments, the assistant(s)/monitor(s) 402 can be communicably couple to the EMF vehicle apparatus 200 and/or the EMF offboard apparatus 304 via, for example, an electronic communications bus configured to facilitate the transmission and/or receipt of various types of data. Additionally or alternatively, the assistant(s)/monitor(s) 402 can be configured transmit and/or receive various types of data to and/or from the EMF vehicle apparatus 200 and/or the EMF offboard apparatus 304 via a communications network (e.g., communications network 110).

The various types of data can comprise, but are not limited to, data configured to enhance the situational awareness of one or more operators of a vehicle (e.g., a pilot, a remote operator, and/or a flight crew member), as well as data related to one or more adverse situations that can impact the operation of a corresponding vehicle (e.g., aerial vehicle 112). For example, as depicted in FIG. 4, the assistant(s)/monitor(s) 402 can generate, monitor, collect, compile, measure, analyze, and/or otherwise receive one or more portions of data including, but not limited to, travel event data 404, sensor data 406, vehicle system data 408, environmental data 410, personnel data 412, air traffic data 414, and/or vehicle operation constraint data 416.

The assistant(s)/monitor(s) 402 can transmit the respective types of data to the event management engine 324 as model input. For example, in various embodiments, the assistant(s)/monitor(s) 402 can transmit the various types of data to the event management engine 324 via one or more circuitries (e.g., processor 202, communication circuitry 208, event management circuitry 214) associated with, for example, the EMF vehicle apparatus 200. As such, the event management engine 324 can use the model input comprising the various types of data listed above to determine whether one or more event(s) are currently impacting and/or could potentially impact the operation of a corresponding vehicle (e.g., aerial vehicle 112).

In various embodiments, the travel event data 404 can comprise data related to at least one of data indicative of a nominal scenario, an emergency scenario, data indicative of a hazard scenario, data indicative of a logistical scenario that alters the voyage of the aerial vehicle, and/or data indicative of a change in the operation of a system affecting control of the aerial vehicle. In various embodiments, at least a portion of the travel event data 404 is based at least in part on vehicle sensor data collected, measured, calculated, and/or otherwise generated by one or more sensor(s) 210 associated with the vehicle (e.g., aerial vehicle 112).

In various embodiments, the sensor data 406 can be vehicle sensor data. Vehicle sensor data can be any data collected, measured, calculated, and/or otherwise generated by one or more sensors associated with the vehicle. The sensor data 406 can also be data collected, measured, generated, calculated, and/or otherwise obtained by the sensor(s) 210.

The vehicle system data 408 can comprise data related to the health (e.g., current status, current operational capacity) of one or more vehicle systems associated with a vehicle (e.g., aerial vehicle 112) including, but not limited to, fuel systems, energy systems, electrical systems, propulsion systems, mechanical systems, safety systems, and/or the like. In various embodiments, the vehicle system data 408 can comprise data related to the aerial vehicle onboard system(s) 102 and/or the travel operation management system(s) 106.

In various embodiments, the environmental data 410 can be obtained by one or more environmental data system(s) 108 and can be data representing one or more aspect(s) of a real-world environment, object(s) therein, and/or vehicle(s) (e.g., aerial vehicles) therein. In various embodiments, the environmental data 410 can be weather data, obstacle data, and/or any other data related to an environment in which the vehicle (e.g., aerial vehicle 112) is currently traveling through or will be travelling through in the future.

In various embodiments, the personnel data 412 can be one or more portions of data related to any personnel responsible for the operation of a vehicle (e.g., aerial vehicle 112). For example, the personnel data 412 can be data related to one or more pilot(s), one or more remote operator(s), one or more crew members, and/or one or more passengers associated with the vehicle. In various embodiments, the personnel data can be identifying data and/or bio-marker data (e.g., as collected by one or more bio-sensors configured to monitor one or more biological parameters). In various embodiments, the personnel data 412 can also be user input data generated by the one or more pilot(s), one or more remote operator(s), one or more crew members, and/or one or more passengers via, for example, the input/output circuitry associated with a computing device related to the vehicle (e.g., input/output circuitries 206 and/or 310 respectively).

In various embodiments, the air traffic data 414 can comprise data related to any air traffic that may impact the operation of the vehicle (e.g., aerial vehicle 112). For example, the air traffic data 414 can comprise separation data describing the relative distances between one or more vehicles. Additionally, the air traffic data 414 can also comprise collision avoidance data generated by one or more collision avoidance systems associated with the vehicle.

In various embodiments, the vehicle operation constraint data 416 comprises data related to at least of one or more constraints related to the configuration of one or more vehicle systems associated with the vehicle (e.g., aerial vehicle 112), constraints related to a flight plan (e.g., destinations, waypoints, flight paths, arrival/departure schedules, and/or the like), power consumption constraints (e.g., battery and/or fuel consumption thresholds), specific vehicle constraints (e.g., performance capabilities associated with one or more vehicle systems of the aerial vehicle 112), environmental constraints (e.g., regulations related to operating an aerial vehicle 112 in an urban environment), and/or the like. In various embodiments, the vehicle operation constraint data 416 can be generated by one or more computing devices associated with the operation of the vehicle such as, for example, the EMF vehicle apparatus 200 and/or the EMF offboard apparatus 304.

In various embodiments, the event management engine 324 is configured to generate and/or execute one or more action(s) 418 in response to determining (e.g., based on the data obtained by the assistant(s)/monitor(s) 402) that one or more events is impacting the operation of a corresponding vehicle (e.g., aerial vehicle 112). In various embodiments, the action(s) 418 are associated with one or more recommendation(s) 420 generated by the event management engine 324. For example, based on the one or more recommendation(s) 418 generated in response to one or more particular events impacting the operation of the corresponding vehicle (e.g., aerial vehicle 112), the action(s) 418 can be configured to engage one or more actuators (e.g., one or more aerial vehicle onboard system(s) 102) to execute one or more operations associated with the one or more recommendation(s) 420. As such, the action(s) 418 can be configured cause the operation of one or more system(s) (e.g., one or more aerial vehicle onboard system(s) 102 associated with the vehicle (e.g., aerial vehicle 112). In various embodiments, the action(s) 418 can be configured as one or more portions of executable computer program code.

In this regard, the action(s) 418 and/or the recommendation(s) 420 can be transmitted to one or more computing devices associated with the EMF vehicle segment 322 (e.g., the EMF vehicle apparatus 200) and/or the EMF offboard segment 302 (e.g., the EMF offboard apparatus 304). In some embodiments, the one or more computing devices associated with the EMF vehicle segment 322 (e.g., the EMF vehicle apparatus 200) and/or the EMF offboard segment 302 (e.g., the EMF offboard apparatus 304) can cause initiation and/or execution of the one or more action(s) 418 associated with one or more recommendation(s) 420.

FIGS. 5A-5D illustrate the one-to-one, one-to-many, many-to-one, and many-to-many relationships between events impacting the operation of a vehicle and recommendations generated in response to the events respectively, in accordance with at least some example embodiments of the present disclosure. FIGS. 5A-5D highlight one or more technical benefits provided by the various embodiments described herein. Specifically, FIGS. 5A-5D illustrate how the event management engine 324 can generate one or more recommendations (e.g., one or more recommendation(s) 420A-N) for one or more event(s) 502A-N.

As described herein, the event management engine 324 can generate one or more recommendation(s) 420A-N based at least in part on a single event (e.g., event 502A) or based at least in part on two or more distinct events (e.g., event(s) 502A-N) that may impact the operation of a vehicle (e.g., aerial vehicle 112). A few non-limiting examples of event types that can be associated with a respective event 502A include, an emergency event type, a hazard event type, a mechanical failure event type, a logistical event type, an environmental event type, an optimization event type, a personnel health event type, and/or the like.

Non-limiting examples of recommendation(s) 420A-N that can be generated to address the various event(s) 502A-N can include a recommendation to execute an emergency landing, execute a controlled landing in a predetermined landing zone, switch a current operational mode of the vehicle (e.g., switch the aerial vehicle 112 into an economy flight mode from a normal operational mode), adjust one or more vehicle operation constraints (e.g., mission goals, flight plans, destinations, waypoints, and/or the like), alter a current flight path of an aerial vehicle (e.g., alter a current heading, altitude, speed, and/or the like of an aerial vehicle 112), and/or reconfigure one or more vehicle systems (e.g., one or more aerial vehicle onboard system(s) 102) associated with the vehicle.

As shown in FIG. 5A, the event management engine 324 may determine that a single event 502A is impacting the operation of a vehicle (e.g., aerial vehicle 112) and, as such, has generated a set of recommendation(s) 420A-N with which to mitigate the event 502A. As a non-limiting example, the event management engine 324 may have determined that an event 502A associated with a partial failure of an aerial vehicle onboard system 102 has occurred and, as such generates multiple recommendation(s) 420A-N with which to mitigate the event 502A. In this non-limiting example, the event management engine 324 may have generated a first recommendation 420A to switch the vehicle into an alternate operational mode (e.g., an economy mode to put less stress on the vehicle), a second recommendation 420B to shut down one or more components related to the partial failure of the aerial vehicle onboard system 102, as well as a third recommendation 420C to end the current mission and divert the vehicle (e.g., aerial vehicle 112) to a nearby airport before future problems arise.

As described herein, the event management engine 324 can rank the recommendation(s) 420A-C based at least in part on a predicted result associated with the execution of the one or more recommendation(s) 420A-C. For example, the first recommendation 420A can be ranked higher relative to the second recommendation 420B based at least in part on a predicted result associated with the first recommendation 420A. The predicted result can reflect a probability that executing the first recommendation 420A will positively mitigate, correct, and/or otherwise successfully address the event 502A impacting the operation of the vehicle. In this non-limiting example, the event management engine 324 may have generated ten (10) recommendation(s) 420A-N, but, based on the respective predicted results associated with the ten (10) recommendation(s) 420A-N, determined to render only the recommendations 420A-C for selection. Furthermore, the event management engine 324 can determine which of the ten (10) recommendations 420A-N to render via a computing device (e.g., the EMF vehicle apparatus 200 and/or the EMF offboard apparatus 304) based the respective rankings of the ten (10) recommendations 420A-N FIG. 5B illustrates a scenario in which the event management engine 324 may determine that multiple event(s) 502A-N are impacting the operation of the vehicle (e.g., aerial vehicle 112). In the particular scenario illustrated in FIG. 5B, the event management engine 324 may have determined that only one recommendation 420A would be applicable for mitigating the multiple event(s) 502A-N. As a non-limiting example, the event management engine 324 may have determined that a first event (e.g., 502A) associated with a partial failure of an aerial vehicle onboard system 102 has occurred in addition to determining that a second event (e.g., event 502B) associated with a serious weather hazard is occurring simultaneously. In such a scenario, the event management engine 324 can determine that the only appropriate recommendation would be a recommendation 420A to divert the vehicle (e.g., aerial vehicle 112) to a nearby airport rather than complete the current mission. In a similar scenario, if the first event 502A was classified as having a critical severity level (e.g., a complete failure of the aerial vehicle onboard system 102 rather than a partial failure) in addition to experiencing the serious weather hazard of the second event 502B, the single recommendation 420A may have been to execute an immediate emergency landing rather than divert the vehicle (e.g., aerial vehicle 112) to an alternate airport.

FIG. 5C illustrates a scenario in which the event management engine 324 has determined that multiple event(s) 502A-N are impacting the operation of the vehicle (e.g., aerial vehicle 112) and, as such, has generated a set of recommendation(s) 420A-N with which to mitigate the event(s) 502A-N. In scenarios in which two or more distinct events are occurring that may impact the operation of the vehicle (e.g., two or more event(s) 502A-N associated with respective distinct event types), one or more respective recommendation(s) (e.g., recommendation 420A) may only address one respective event (e.g., event 502A) of the two or more distinct events (e.g., event(s) 502A-N).

As shown in FIG. 5D, the event management engine 324 may determine that a single event 502A is impacting the operation of a vehicle (e.g., aerial vehicle 112). In the particular scenario illustrated in FIG. 5D, the event management engine 324 may have determined that only one recommendation 420A would be applicable for mitigating the single event 502A. As a non-limiting example, the event management engine 324 may have determined that an event 502A associated with a partial failure of an aerial vehicle onboard system 102 related to a battery system of the vehicle has occurred and, as such, may have generated a single recommendation 420A to switch the vehicle into an alternate operational mode (e.g., an economy mode to put less stress on the battery system of the vehicle).

Additionally or alternatively, one or more respective recommendation(s) 420A-N may address multiple distinct events of the two or more distinct events 502A-N. The event management engine 324 can determine which recommendation(s) 420A-N of the set of recommendation will have the greatest positive effect on the current situation associated with the vehicle (e.g., aerial vehicle 112). Because the event management engine 324 can detect two or more distinct event(s) 502A-N impacting the operation of the aerial vehicle 112, and because the two or more distinct event(s) 502A-N can be classified as having distinct event types and/or differing event severity levels, the event management engine 324 can determine an overall event criticality level associated with the two or more distinct events 502A-N. For example, the overall event criticality level can be a cumulative representation of the potential impact the two or more distinct events 502A-N may have on the operation of the vehicle (e.g., aerial vehicle 112). Said another way, the two or more distinct events 502A-N associated with two or more respective event severity levels can be considered simultaneously such that the respective severity levels are combined.

Example Processes of the Disclosure

Having described example systems, apparatuses, data flows, user interfaces, and user interface elements in accordance with the present disclosure, example processes of the disclosure will now be discussed. It will be appreciated that each of the flowcharts depicts an example computer-implemented process that is performable by various means, including one or more of the apparatuses, systems, devices, and/or computer program products described herein, for example utilizing one or more of the specially configured components thereof.

It will be understood that each block of the processes, and combinations of blocks in the flowcharts, may be implemented by various means including hardware and/or a computer program product comprising one or more computer-readable mediums having computer-readable program instructions stored thereon. For example, one or more of the processes described herein in some embodiments is/are embodied by computer program of a computer program product. In this regard, the computer program product(s) that embody the process(es) described herein in some embodiments comprise one or more non-transitory memory devices of a computing device, apparatus, and/or the like (for example, the memory 204 of the EMF vehicle apparatus 200) storing instructions executable by a processor of a computing device (for example, by the processor 202 of the EMF vehicle apparatus 200). In some embodiments, the computer program instructions of the computer program product that embody the processes are stored by non-transitory computer-readable storage mediums of a plurality of computing devices. It will be appreciated that any such computer program product(s) may be loaded onto one or more computer(s) and/or other programmable apparatus(es) (for example, an EMF vehicle apparatus 200), such that the computer program product including the program code instructions that execute on the computer(s) or other programmable apparatus(es) create means for implementing the functions specified in the operational block(s).

Further, in some embodiments, the computer program product includes one or more non-transitory computer-readable memories on which the computer program instructions are stored such that the one or more computer-readable memories can direct one or more computer(s) and/or other programmable apparatus(es) to function in a particular manner, such that the computer program product comprises an article of manufacture that implements the function(s) specified in the operational block(s). Additionally or alternatively, in some embodiments, the computer program instructions of one or more computer program product(s) are loaded onto computer(s) or other programmable apparatus(es) to cause a series of operations to be performed on the computer(s) or other programmable apparatus(es) a computer-implemented process such that the instructions that execute on the computer(s) or other programmable apparatus(es) implement the functions specified in the operational block(s).

Each of the processes depicted includes a plurality of operational blocks defining a particular algorithm for performing one or more portion(s) of functionality for generating and/or outputting improved user interface(s) as described herein. The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 6:
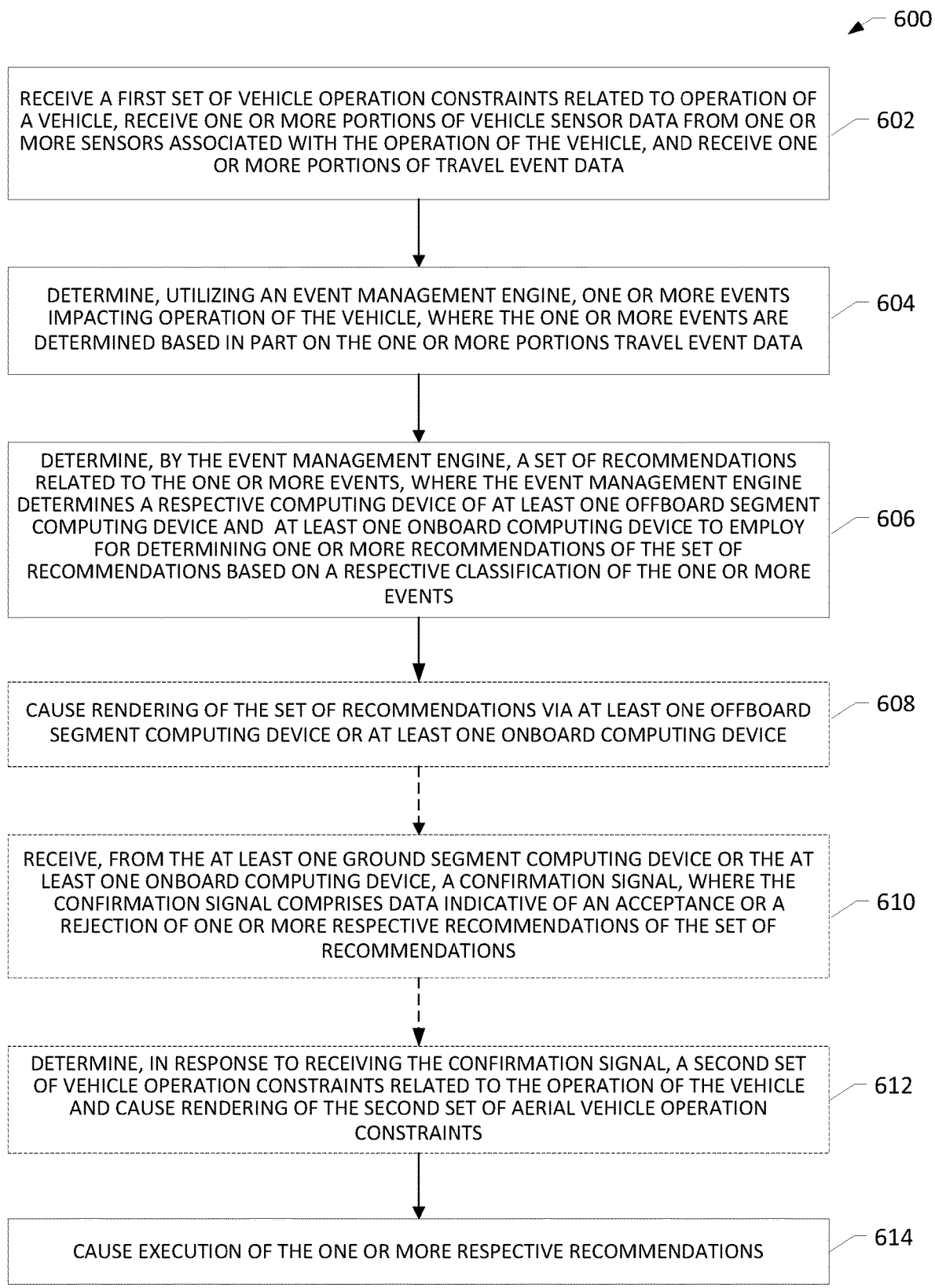
FIG. 6 illustrates a flowchart depicting example operations of an example process for managing one or more events impacting the operation of a vehicle in accordance with at least some example embodiments of the present disclosure.

FIG. 6 illustrates a flowchart depicting example operations of an example process for managing one or more events impacting the operation of an aerial vehicle in accordance with at least some example embodiments of the present disclosure. Specifically, FIG. 6 depicts operations of an example process 600 for managing one or more events impacting the operation of an aerial vehicle 112. In some embodiments, the process 600 is embodied by a computer-implemented process executable by any of a myriad of computing device(s), apparatus(es), system(s), and/or the like as described herein. Alternatively or additionally, in some embodiments, the process 600 is embodied by computer program code stored on a non-transitory computer-readable storage medium of a computer program product configured for execution to perform the process as depicted and described.

Alternatively or additionally, in some embodiments, the process 600 is performed by one or more specially configured computing devices, such as the EMF vehicle apparatus 200 alone or in communication with one or more other component(s), device(s), system(s), and/or the like (e.g., such as the EMF offboard apparatus 304). In this regard, in some such embodiments, the EMF vehicle apparatus 200 is specially configured by computer-coded instructions (e.g., computer program instructions) stored thereon, for example in the memory 204 and/or another component depicted and/or described herein and/or otherwise accessible to the EMF vehicle apparatus 200, for performing the operations as depicted and described. In some embodiments, the EMF vehicle apparatus 200 is in communication with one or more external apparatus(es), system(s), device(s), and/or the like, to perform one or more of the operations as depicted and described. For example, the EMF vehicle apparatus 200 in some embodiments is in communication with an end-user computing device, one or more external system(s), and/or the like (e.g., such as the EMF offboard segment 302). It will be appreciated that while the process 600 is described as performed by and from the perspective of the EMF vehicle apparatus 200 for purposes of simplifying the description, the process 600 can also be performed, in total or in part, by the EMF offboard apparatus 304 of the EMF offboard segment 302.

The process 600 begins at operation 602. At operation 602, the EMF vehicle apparatus 200 includes means such as the sensor(s) 210, vehicle control circuitry 212, event management circuitry 214, communications circuitry 208, input/ output circuitry 206, processor 202, and/or the like, or a combination thereof, to receive a first set of vehicle operation constraints related to operation of a vehicle (e.g., aerial vehicle 112), receive one or more portions of vehicle sensor data from one or more sensors associated with the operation of the vehicle (e.g., aerial vehicle 112), and receive one or more portions of travel event data. For example, an operator associated with an aerial vehicle 112 (e.g., a remote operator, pilot, and/or flight crew member) can generate and/or input one or more vehicle operation constraints via the EMF vehicle apparatus 200. Additionally and/or alternatively, the one or more vehicle operation constraints can be generated and/or input via the EMF offboard apparatus 304. Vehicle operation constraints can include, but are not limited to, constraints related to the configuration of one or more vehicle systems associated with the aerial vehicle 112, constraints related to a flight plan (e.g., destinations, waypoints, flight paths, arrival/departure schedules, and/or the like), power consumption constraints (e.g., battery and/or fuel consumption thresholds), specific vehicle constraints (e.g., performance capabilities associated with one or more vehicle systems of the aerial vehicle 112), environmental constraints (e.g., regulations related to operating an aerial vehicle 112 in an urban environment), and/or the like.

The EMF vehicle apparatus 200 is also configured to receive one or more portions of vehicle sensor data related to the operation of the aerial vehicle 112. Vehicle sensor data can be any data collected, measured, calculated, and/or otherwise generated by one or more sensors (e.g., one or more sensors 210) associated with the vehicle (e.g., aerial vehicle 112). Additionally, the EMF vehicle apparatus 200 is configured to receive one or more portions of travel event data associated with the vehicle (e.g., aerial vehicle 112). The one or more portions of travel event data can be data indicative of a nominal scenario, an emergency scenario, a hazard scenario, a scenario that alters the voyage of the aerial vehicle, and/or a change in the operation of a system affecting control of the aerial vehicle. In various embodiments, at least a portion of the travel event data is based at least in part on vehicle sensor data collected, measured, calculated, and/or otherwise generated by one or more sensors (e.g., one or more sensors 210) associated with the vehicle. Additionally or alternatively, travel event data can be generated in part by one or more components of the vehicle (e.g., aerial vehicle 112), one or more components of the EMF offboard apparatus 304, and/or one or more of the environment data system(s) 108 and the travel operation management system(s) 106 associated with the EMF offboard segment 302.

At operation 604, the EMF vehicle apparatus 200 includes means such as the sensor(s) 210, vehicle control circuitry 212, event management circuitry 214, communications circuitry 208, input/output circuitry 206, processor 202, and/or the like, or a combination thereof, to determine, utilizing an event management engine 324, one or more events impacting operation of the aerial vehicle 112, where the one or more events are determined based in part on the one or more portions travel event data. The one or more events can be a situation and/or circumstance that has the potential to impact the operation of an aerial vehicle. For instance, an event can be an emergency situation impacting the operation of the aerial vehicle and/or one or more persons associated with the aerial vehicle. An event can also be a circumstance affecting the optimization of one or more vehicle systems associated with the aerial vehicle. A few non-limiting examples of event types that can be associated with a respective event include, an emergency event type, a hazard event type, a mechanical failure event type, a logistical event type, an environmental event type, an optimization event type, a personnel health event type, and/or the like. Determination of an event can be based in part on one or more portions of travel event data At operation 606, the EMF vehicle apparatus 200 includes means such as the sensor(s) 210, vehicle control circuitry 212, event management circuitry 214, communications circuitry 208, input/output circuitry 206, processor 202, and/or the like, or a combination thereof, to determine, by the event management engine 324, a set of recommendations related to the one or more events, where the event management engine 324 determines a respective computing device of at least one ground segment computing device (e.g., EMF offboard apparatus 304) and at least one onboard computing device (e.g., EMF vehicle apparatus 200) to employ for determining one or more recommendations of the set of recommendations based at least in part on a respective classification of the one or more events.

In various embodiments, the event management engine 324 can be distributed across the EMF 300. For instance, the event management engine 324 can be distributed between the EMF vehicle segment 322 and the EMF offboard segment 302 and, as such, can receive model input from the EMF vehicle segment 322 and/or the EMF offboard segment 302. Based at least in part on the criticality of one or more events impacting the operation of an aerial vehicle 112, the event management engine 324 can determine whether the one or more events should be managed by the EMF vehicle segment 322 or the EMF offboard segment 302. Determining whether the EMF vehicle segment 322 should manage the event can be based at least in part on various factors including, but not limited to, an event severity level associated with the one or more events, an event type associated with the one or more events, the computational processing capabilities of the one or more aerial vehicle onboard system(s) 102 associated with the aerial vehicle 112, the computational processing capabilities of the EMF vehicle apparatus 200, and/or the computational processing capabilities of the EMF offboard apparatus 304. In this way, the event management engine 324 can determine which respective computing devices associated with the EMF vehicle segment 322 and/or the EMF offboard segment 302 are best qualified to make decisions, generate recommendations, and/or assume control of the one or more vehicle systems (e.g., aerial vehicle onboard system(s) 102) of the aerial vehicle 112.

Non-limiting examples of recommendations can include a recommendation to execute an emergency landing, execute a controlled landing in a predetermined landing zone, switch a current operational mode of the aerial vehicle 112 (e.g., switch the aerial vehicle into an economy flight mode from a normal operational mode), adjust one or more operation constraints (e.g., mission goals, flight plans, destinations, waypoints, and/or the like), alter a current flight path of aerial vehicle 112 (e.g., alter a current heading, altitude, speed, and/or the like), and/or reconfigure one or more vehicle systems (e.g., one or more aerial vehicle onboard system(s) 102) associated with the aerial vehicle 112.

At optional operation 608, the EMF vehicle apparatus 200 includes means such as the sensor(s) 210, vehicle control circuitry 212, event management circuitry 214, communications circuitry 208, input/output circuitry 206, processor 202, and/or the like, or a combination thereof, to cause rendering of the set of recommendations via the at least one ground segment computing device (e.g., EMF offboard apparatus 304) or at least one onboard computing device (e.g., EMF vehicle apparatus 200). In various embodiments, the recommendations generated by the event management engine 324 can be configured to be human-readable and can be rendered via a respective electronic interface associated with one or more computing devices such as, for example an EMF vehicle apparatus 200 associated with the aerial vehicle 112 and/or an EMF offboard apparatus 304 associated with the EMF 300. In some embodiments, the event management engine 324 can rank the one or more recommendations and based at least in part on the relative ranks of the one or more recommendations the event management engine 324 can determine which of the one or more recommendations to render via one on or more respective computing devices.

For instance, a first recommendation can be ranked higher relative to a second recommendation based at least in part on a predicted result associated with the first recommendation. The predicted result can reflect a probability that executing the first recommendation will positively mitigate, correct, and/or otherwise successfully address the one or more events impacting the operation of the aerial vehicle 112. In some embodiments, the event management engine 324 can determine which of the one or more recommendations of the set of recommendations to render (e.g., via a respective electronic interface associated with the EMF vehicle apparatus 200 and/or the EMF offboard apparatus 304) based at least in part on the respective ranks of the one or more recommendations.

At optional operation 610, the EMF vehicle apparatus 200 includes means such as the sensor(s) 210, vehicle control circuitry 212, event management circuitry 214, communications circuitry 208, input/output circuitry 206, processor 202, and/or the like, or a combination thereof, to receive, from the at least one ground segment computing device (e.g., EMF offboard apparatus 304) or at least one onboard computing device (e.g., EMF vehicle apparatus 200), a confirmation signal, where the confirmation signal comprises data indicative of an acceptance or a rejection of one or more respective recommendations of the set of recommendations. Recommendations can be confirmed or denied by an operator (e.g., a remote operator, a pilot, and/or a flight crew member) of the aerial vehicle 112, where confirmation can be a selection indication indicating acceptance or rejection of the recommendation generated via one or more computing devices.

At optional operation 612, the EMF vehicle apparatus 200 includes means such as the sensor(s) 210, vehicle control circuitry 212, event management circuitry 214, communications circuitry 208, input/output circuitry 206, processor 202, and/or the like, or a combination thereof, to determine, in response to receiving the confirmation signal, a second set of aerial vehicle operation constraints related to the operation of the aerial vehicle 112 and cause rendering of the second set of aerial vehicle operation constraints.

Once the one or more recommendations have been accepted, the event management engine 324 can generate a second set of vehicle operation constraints related to the accepted recommendations. The second set of vehicle operation constraints can be rendered via a respective electronic interface associated with the EMF vehicle apparatus 200 and/or the EMF offboard apparatus 304 such that an operator (e.g., a remote operator, a pilot, and/or a flight crew member) can interpret the details of the new vehicle operation constraints. The second set of vehicle operation constraints can contain pertinent information including, but not limited to, new destinations, new waypoints, new flight paths, new vehicle system configurations, new operational modes, and/ or the like that are associated with the operation of the aerial vehicle 112. In various circumstances, rather than generating an entirely new set (e.g., a second set) of vehicle operation constraints, the event management engine 324 can make one or more relevant updates to the first set of vehicle operation constraints associated with the aerial vehicle 112.

At operation 614, the EMF vehicle apparatus 200 includes means such as the sensor(s) 210, vehicle control circuitry 212, event management circuitry 214, communications circuitry 208, input/output circuitry 206, processor 202, and/or the like, or a combination thereof, cause execution of the one or more respective recommendations. In circumstances in which one or more recommendations are accepted, the confirmation causes execution of the one or more recommendations. Executing a recommendation comprises operating one or more systems associated with the aerial vehicle 112 (e.g., one or more aerial vehicle onboard system(s) 102) to control the operation of the aerial vehicle 112. In some embodiments, a recommendation must be confirmed by a human operator (e.g., a remote operator) or pilot responsible for operating the aerial vehicle 112. In various other embodiments, recommendations can be automatically executed depending on the criticality of the corresponding event impacting the operation of the aerial vehicle 112.

Figure 7:
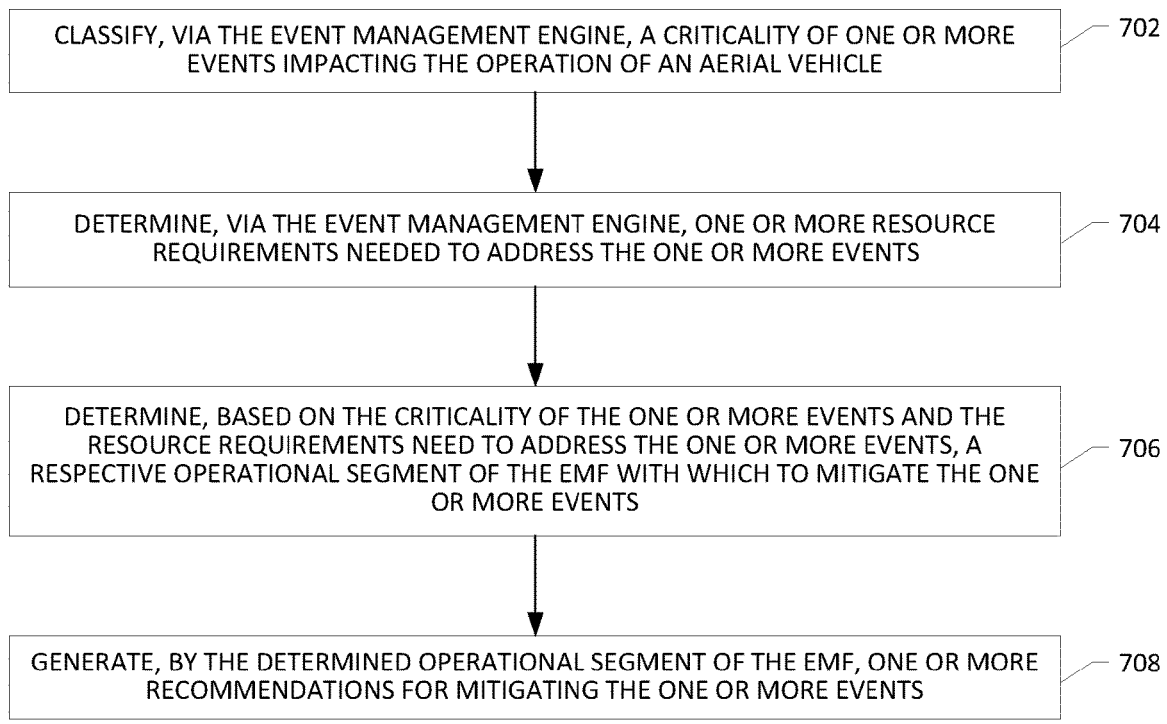
FIG. 7 illustrates a flowchart depicting example operations of an example process for classifying one or more events impacting the operation of a vehicle in accordance with at least some example embodiments of the present disclosure.

FIG. 7 illustrates a flowchart depicting example operations of an example process for managing one or more events impacting the operation of an aerial vehicle in accordance with at least some example embodiments of the present disclosure. Specifically, FIG. 7 depicts operations of an example process 700 for managing one or more events impacting the operation of an aerial vehicle 112. In some embodiments, the process 700 is embodied by a computer-implemented process executable by any of a myriad of computing device(s), apparatus(es), system(s), and/or the like as described herein. Alternatively or additionally, in some embodiments, the process 700 is embodied by computer program code stored on a non-transitory computer-readable storage medium of a computer program product configured for execution to perform the process as depicted and described.

Alternatively or additionally, in some embodiments, the process 700 is performed by one or more specially configured computing devices, such as the EMF vehicle apparatus 200 alone or in communication with one or more other component(s), device(s), system(s), and/or the like (e.g., such as the EMF offboard apparatus 304). In this regard, in some such embodiments, the EMF vehicle apparatus 200 is specially configured by computer-coded instructions (e.g., computer program instructions) stored thereon, for example in the memory 204 and/or another component depicted and/or described herein and/or otherwise accessible to the EMF vehicle apparatus 200, for performing the operations as depicted and described. In some embodiments, the EMF vehicle apparatus 200 is in communication with one or more external apparatus(es), system(s), device(s), and/or the like, to perform one or more of the operations as depicted and described. For example, the EMF vehicle apparatus 200 in some embodiments is in communication with an end-user computing device, one or more external system(s), and/or the like (e.g., such as the EMF offboard segment 302). It will be appreciated that while the process 700 is described as performed by and from the perspective of the EMF vehicle apparatus 200 for purposes of simplifying the description, the process 700 can also be performed, in total or in part, by the EMF offboard apparatus 304 of the EMF offboard segment 302.

The process 700 begins at operation 702. In some embodiments, the process 700 begins after one or more operations depicted and/or described with respect to any of the other processes described herein. For example, in some embodiments as depicted, the process 700 begins after execution of operation 604. In this regard, some or all of the process 700 may replace or supplement one or more blocks depicted and/or described with respect to any of the processes described herein. In some embodiments, upon completion of the process 700, the flow of operations terminates. Additionally or alternatively, as depicted, in some embodiments upon completion of the process 700 flow returns to one or more operation(s) of another process, such as the operation 608. It will be appreciated that, in some embodiments, the process 700 embodies a sub-process of one or more other process(es) depicted and/or described herein, for example the process 600.

At operation 702, the EMF vehicle apparatus 200 includes means such as the sensor(s) 210, vehicle control circuitry 212, event management circuitry 214, communications circuitry 208, input/output circuitry 206, processor 202, and/or the like, or a combination thereof, to classify, via the event management engine 324, a criticality of one or more events impacting the operation of a vehicle (e.g., aerial vehicle 112). For instance, once the event management engine 324 determines that one or more events that can impact the operation of the aerial vehicle 112 is occurring, the event management engine 324 can determine an event severity level associated with the one or more events. As a non-limiting example, the event management engine 324 can classify one or more events as having a low severity level, a moderate severity level, a high severity level, a critical severity level, and/or the like. One or more event severity thresholds can be predetermined and incorporated by the event management engine 324 (e.g., comprised in a predefined rule set associated with the event management engine 324) such that when a respective event severity level associated with the one or more events satisfies the one or more event severity thresholds the event management engine 324 can generate one or more recommendations and/or trigger one or more actions to address the one or more events. In some embodiments, various event types can be associated with a predefined event severity level. For example, in some embodiments, a logistical event type can be automatically associated with a low severity level, whereas a systems failure event type may automatically be associated with a critical severity.

At operation 704, the EMF vehicle apparatus 200 includes means such as the sensor(s) 210, vehicle control circuitry 212, event management circuitry 214, communications circuitry 208, input/output circuitry 206, processor 202, and/or the like, or a combination thereof, to determine, via the event management engine 324, one or more resource requirements needed to address the one or more events. In some embodiments, events of various types may require more resource efficiency with which to manage the events efficiently and effectively. For example, an emergency event may require different computational resources than a logistical event. Furthermore, an emergency event may be critically time-sensitive and, as such, time must be weighed as an additional required resource in addition to computational processing power when determining which operational segment should be deployed to mitigate an event.

In some embodiments, various event types associated with a respectively low criticality such that the event may not warrant immediate attention. For example, a minor logistical event need not be immediately addressed. In contrast, an emergency event related to a failure of one or more vehicle systems needs to be addressed immediately to ensure the safety of the aerial vehicle 112. A few non-limiting examples of event types that can be associated with a respective event include, an emergency event type, a hazard event type, a mechanical failure event type, a logistical event type, an environmental event type, an optimization event type, a personnel health event type, and/or the like. In scenarios in which the aerial vehicle 112 is not in immediate danger, it is desirable to manage events associated with the aerial vehicle 112 from the EMF offboard segment 302 rather than the EMF vehicle segment 322. Delegating operations to the EMF offboard segment 302 can ensure that processing power, computational resources, power consumption and/or other various resources associated with the vehicle systems of the aerial vehicle 112 are conserved and/or or optimized.

At operation 706, the EMF vehicle apparatus 200 includes means such as the sensor(s) 210, vehicle control circuitry 212, event management circuitry 214, communications circuitry 208, input/output circuitry 206, processor 202, and/or the like, or a combination thereof, to determine, based at least in part on the criticality of the one or more events and the computational requirements need to address the one or more events, a respective operational segment of the EMF 300 with which to mitigate the one or more events. Based at least in part on the criticality of one or more events impacting the operation of an aerial vehicle 112 and/or the computational resources required to address the one or more events, the event management engine 324 can determine whether the one or more events should be managed by the EMF vehicle segment 322 or the EMF offboard segment 302.

Determining whether the EMF vehicle segment 322 should manage the event can be based at least in part on various factors including, but not limited to, an event severity level associated with the one or more events, an event type associated with the one or more events, the computational processing capabilities of the one or more aerial vehicle onboard system(s) 102 associated with the aerial vehicle 112, the computational processing capabilities of the EMF vehicle apparatus 200, and/or the computational processing capabilities of the EMF offboard apparatus 304. In this way, the event management engine 324 can determine which respective computing devices associated with the EMF vehicle segment 322 and/or the EMF offboard segment 302 are best qualified to make decisions, generate recommendations, and/or assume control of the one or more vehicle systems (e.g., aerial vehicle onboard system(s) 102) of the aerial vehicle 112.

At operation 708, the EMF vehicle apparatus 200 includes means such as the sensor(s) 210, vehicle control circuitry 212, event management circuitry 214, communications circuitry 208, input/output circuitry 206, processor 202, and/or the like, or a combination thereof, to generate, by the determined operational segment of the EMF 300, one or more recommendations for mitigating the one or more events. Once the event management engine 324 determines whether the EMF offboard segment 302 or the EMF vehicle segment 322 should be employed to generate recommendations, make decisions, predict results, execute one or more actions and/or otherwise mitigate the one or more events impacting the operation of the aerial vehicle 112, the event management engine 324 can, by way of the respective computing devices of the chosen operational segment, generate one or more recommendations for managing the one or more events. Non-limiting examples of recommendations can include a recommendation to execute an emergency landing, execute a controlled landing in a predetermined landing zone, switch a current operational mode of the aerial vehicle 112 (e.g., switch the aerial vehicle into an economy flight mode from a normal operational mode), adjust one or more operation constraints (e.g., mission goals, flight plans, destinations, waypoints, and/or the like), alter a current flight path of aerial vehicle 112 (e.g., alter a current heading, altitude, speed, and/or the like), and/or reconfigure one or more vehicle systems (e.g., one or more aerial vehicle onboard system(s) 102) associated with the aerial vehicle 112.

CONCLUSION

While several example contexts are described herein with respect to processing of data by an aerial vehicle, it will be appreciated in view of this disclosure that embodiments may include or otherwise be implemented as a part of other vehicle(s), device(s), and/or the like. For example, in other contexts, embodiments of the present disclosure utilize sensor(s) of and/or display data to display(s) of other type(s) of vehicle(s), including ground vehicle(s). Alternatively or additionally, some embodiments utilize sensor(s) of and/or display data to display(s) of other device(s), including user device(s), back-end computing device(s), and/or the like. Indeed, in some embodiments, the sensor(s), computing device(s), and/or display(s) are embodied and/or otherwise included in one or more computing device(s) not integrated as part of any vehicle (e.g., as a standalone computing device). In is intended that all such contexts, device type(s), and/or the like be included within the scope of this disclosure and covered within the scope of the claims appended herein.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method, the computer-implemented method comprising:
   receiving a first set of vehicle operation constraints related to operation of an aerial vehicle;
   receiving vehicle sensor data from one or more sensors associated with the operation of the aerial vehicle;
   receiving travel event data;
   determining, utilizing an event management engine, one or more events impacting operation of the aerial vehicle, wherein the one or more events are determined based at least in part on the travel event data and the vehicle sensor data;
   determining, by the event management engine, a set of recommendations related to the one or more events, wherein the set of recommendations is determined based at least in part on the first set of vehicle operation constraints,
      wherein the event management engine is distributed across at least a first operational segment associated with an event management framework and a second operational segment associated with the event management framework,
      wherein the first operational segment comprises at least one offboard segment computing device, and wherein the second operational segment comprises at least one onboard computing device that is onboard the aerial vehicle, and
      wherein the event management engine determines a respective computing device of the first operational segment or the second operational segment to employ for determining one or more recommendations of the set of recommendations based at least in part on a respective classification of the one or more events; and
   automatically triggering operation of one or more vehicle systems affecting control of the aerial vehicle based at least in part on the one or more recommendations.

2. The computer-implemented method of claim 1, the computer-implemented method further comprising:
   causing rendering of the set of recommendations via the at least one offboard segment computing device or the at least one onboard computing device;
   receiving, from the at least one offboard segment computing device or the at least one onboard computing device, a confirmation signal, wherein the confirmation signal comprises data indicative of an acceptance or a rejection of one or more respective recommendations of the set of recommendations; and in response to receiving the confirmation signal:
    determining a second set of aerial vehicle operation constraints related to the operation of the aerial vehicle, wherein determining the second set of aerial vehicle operation constraints comprises updating one or more respective vehicle operation constraints of the first set of vehicle operation constraints; and
    causing rendering of the second set of aerial vehicle operation constraints via the at least one offboard segment computing device or the at least one onboard computing device.

3. The computer-implemented method of claim 1, wherein the travel event data comprise at least one of data indicative of a nominal scenario, an emergency scenario, data indicative of a hazard scenario, data indicative of a logistical scenario that alters a voyage of the aerial vehicle, or data indicative of a change in the operation of the one or more vehicle systems affecting control of the aerial vehicle, and
    wherein at least a portion of travel event data is based on the vehicle sensor data.

4. The computer-implemented method of claim 1, wherein the event management engine is configured as a machine learning model, and
    wherein the event management engine comprises at least one of a binary rule set, a predetermined rule set, a look-up table, or a specially trained neural network that determines the set of recommendations based on the one or more events and the first set of vehicle operation constraints.

5. The computer-implemented method of claim 4, wherein the event management engine can rank the one or more recommendations based on a respective predicted result associated with each of the one or more recommendations, and
    wherein the event management engine can determine which of the one or more recommendations to render via the at least one offboard segment computing device or the at least one onboard computing device based in part on the respective ranks of the one or more recommendations.

6. The computer-implemented method of claim 1, wherein the respective classification of the one or more events determined by the event management engine is based in part on a respective event severity level associated with each of the one or more events.

7. The computer-implemented method of claim 1, wherein the one or more events comprise at least one of an emergency event impacting the operation of the aerial vehicle, an optimization event impacting the operation of the aerial vehicle, a hazard event impacting the operation of the aerial vehicle, a logistical event impacting the operation of the aerial vehicle, an environmental event impacting the operation of the aerial vehicle, or a personnel health event impacting the operation of the aerial vehicle.

8. The computer-implemented method of claim 1, wherein determining the respective computing device of the at least one offboard segment computing device or the at least one onboard computing device to employ for determining the one or more recommendations is based in part on one or more respective computational capabilities associated with the at least one offboard segment computing device and the at least one onboard computing device.

9. The computer-implemented method of claim 1, the computer-implemented method further comprising:

determining, by the event management engine, an overall event criticality level associated with two or more distinct events impacting the operation of the aerial vehicle; and
    generating, by the event management engine, one or more recommendations based on the overall event criticality level associated with the two or more distinct events.

10. An apparatus comprising:
    at least one processor; and
    at least one non-transitory memory storing instructions that, when executed by the at least one processor, cause the apparatus to:
    receive a first set of vehicle operation constraints related to operation of an aerial vehicle;
    receive vehicle sensor data from one or more sensors associated with the operation of the aerial vehicle;
    receive travel event data;
    determine, utilizing an event management engine, one or more events impacting operation of the aerial vehicle, wherein the one or more events are determined based at least in part on the travel event data and the vehicle sensor data;
    determine, by the event management engine, a set of recommendations related to the one or more events, wherein the set of recommendations is determined based at least in part on the first set of vehicle operation constraints,
        wherein the event management engine is distributed across at least a first operational segment associated with an event management framework and a second operational segment associated with the event management framework,
        wherein the first operational segment comprises at least one offboard segment computing device, and wherein the second operational segment comprises at least one onboard computing device that is onboard the aerial vehicle, and
        wherein the event management engine determines a respective computing device of the first operational segment or the second operational segment to employ for
    determining one or more recommendations of the set of recommendations based at least in part on a respective classification of the one or more events; and
    automatically trigger operation of one or more vehicle systems affecting control of the aerial vehicle based at least in part on the one or more recommendations.

11. The apparatus of claim 10, wherein the instructions are further configured to cause the apparatus to:
    cause rendering of the set of recommendations via the at least one offboard segment computing device or the at least one onboard computing device;
    receive, from the at least one offboard segment computing device or the at least one onboard computing device, a confirmation signal, wherein the confirmation signal comprises data indicative of an acceptance or a rejection of one or more respective recommendations of the set of recommendations; and
    in response to receiving the confirmation signal:
        determine a second set of aerial vehicle operation constraints related to the operation of the aerial vehicle, wherein determining the second set of aerial vehicle operation constraints comprises updating one or more respective vehicle operation constraints of the first set of vehicle operation constraints; and
        cause rendering of the second set of aerial vehicle operation constraints via the at least one offboard segment computing device or the at least one onboard computing device.

12. The apparatus of claim 10, wherein the travel event data comprise at least one of data indicative of a nominal scenario, an emergency scenario, data indicative of a hazard scenario, data indicative of a logistical scenario that alters a voyage of the aerial vehicle, or data indicative of a change in the operation of the one or more vehicle systems affecting control of the aerial vehicle, and
wherein at least a portion of travel event data is based on the vehicle sensor data.

13. The apparatus of claim 10, wherein the event management engine is configured as a machine learning model, and
wherein the event management engine comprises at least one of a binary rule set, a predetermined rule set, a look-up table, or a specially trained neural network that determines the set of recommendations based on the one or more events and the first set of vehicle operation constraints.

14. The apparatus of claim 13, wherein the event management engine can rank the one or more recommendations based on a respective predicted result associated with each of the one or more recommendations, and
wherein the event management engine can determine which of the one or more recommendations to render via the at least one offboard segment computing device or the at least one onboard computing device based in part on the respective ranks of the one or more recommendations.

15. The apparatus of claim 10, wherein the respective classification of the one or more events determined by the event management engine is based in part on a respective event severity level associated with each of the one or more events.

16. The apparatus of claim 10, wherein the one or more events comprise at least one of an emergency event impacting the operation of the aerial vehicle, an optimization event impacting the operation of the aerial vehicle, a hazard event impacting the operation of the aerial vehicle, a logistical event impacting the operation of the aerial vehicle, an environmental event impacting the operation of the aerial vehicle, or a personnel health event impacting the operation of the aerial vehicle.

17. The apparatus of claim 10, wherein determining the respective computing device of the at least one offboard segment computing device or the at least one onboard computing device to employ for determining the one or more recommendations is based in part on one or more respective computational capabilities associated with the at least one offboard segment computing device and the at least one onboard computing device.

18. The apparatus of claim 10, wherein the instructions are further configured to cause the apparatus to:
determine, by the event management engine, an overall event criticality level associated with two or more distinct events impacting the operation of the aerial vehicle; and
generate, by the event management engine, one or more recommendations based on the overall event criticality level associated with the two or more distinct events.

19. A computer program product comprising at least one non-transitory computer-readable storage medium having computer program code stored thereon that, in execution with at least one processor, is configured to:
receive a first set of vehicle operation constraints related to operation of an aerial vehicle;
receive vehicle sensor data from one or more sensors associated with the operation of the aerial vehicle;
receive travel event data;
determine, utilizing an event management engine, one or more events impacting operation of the aerial vehicle, wherein the one or more events are determined based at least in part on the travel event data and the vehicle sensor data;
determine, by the event management engine, a set of recommendations related to the one or more events, wherein the set of recommendations is determined based at least in part on the first set of vehicle operation constraints,
wherein the event management engine is distributed across at least a first operational segment associated with an event management framework and a second operational segment associated with the event management framework,
wherein the first operational segment comprises at least one offboard segment computing device, and wherein the second operational segment comprises at least one onboard computing device that is onboard the aerial vehicle, and
wherein the event management engine determines a respective computing device of the first operational segment or the second operational segment to employ for determining one or more recommendations of the set of recommendations based at least in part on a respective classification of the one or more events; and
automatically trigger operation of one or more vehicle systems affecting control of the aerial vehicle based at least in part on the one or more respective recommendations.

20. The computer program product of claim 19, wherein the computer program code is further configured to:
cause rendering of the set of recommendations via the at least one offboard segment computing device or the at least one onboard computing device;
receive, from the at least one offboard segment computing device or the at least one onboard computing device, a confirmation signal, wherein the confirmation signal comprises data indicative of an acceptance or a rejection of one or more respective recommendations of the set of recommendations; and
in response to receiving the confirmation signal:
determine a second set of aerial vehicle operation constraints related to the operation of the aerial vehicle, wherein determining the second set of aerial vehicle operation constraints comprises updating one or more respective vehicle operation constraints of the first set of vehicle operation constraints; and
cause rendering of the second set of aerial vehicle operation constraints via the at least one offboard segment computing device or the at least one onboard computing device.

* * * * *